(12) United States Patent
Namiki

(10) Patent No.: US 12,137,188 B2
(45) Date of Patent: Nov. 5, 2024

(54) IMAGE READING DEVICE WITH TAPPING MEMBER FOR TAPPING REAR END PORTION OF A MEDIUM

(71) Applicant: SEIKO EPSON CORPORATION, Tokyo (JP)

(72) Inventor: Masaki Namiki, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/473,376

(22) Filed: Sep. 25, 2023

(65) Prior Publication Data

US 2024/0106945 A1    Mar. 28, 2024

(30) Foreign Application Priority Data

Sep. 27, 2022   (JP) ................................ 2022-153443
Sep. 27, 2022   (JP) ................................ 2022-153444

(51) Int. Cl.
    *H04N 1/00*      (2006.01)
    *B65H 31/02*     (2006.01)

(52) U.S. Cl.
    CPC ......... *H04N 1/00631* (2013.01); *B65H 31/02* (2013.01); *H04N 1/00588* (2013.01); *H04N 1/00602* (2013.01); *B65H 2801/39* (2013.01)

(58) Field of Classification Search
None
See application file for complete search history.

(56) References Cited

U.S. PATENT DOCUMENTS

| | | | | |
|---|---|---|---|---|
| 5,033,731 A | * | 7/1991 | Looney | B65H 43/08 271/220 |
| 2001/0009625 A1 | * | 7/2001 | Tamehira | B41J 13/106 399/405 |
| 2002/0180137 A1 | * | 12/2002 | Kobayashi | H04N 1/00602 271/3.14 |
| 2012/0026562 A1 | * | 2/2012 | Yoshimoto | G03G 15/605 358/498 |
| 2020/0031149 A1 | * | 1/2020 | Yoshida | H04N 1/00469 |
| 2021/0002097 A1 | * | 1/2021 | Kasuya | G03G 15/6552 |
| 2021/0400154 A1 | * | 12/2021 | Ishida | H04N 1/00588 |
| 2022/0006913 A1 | * | 1/2022 | Nishimura | B65H 31/26 |

FOREIGN PATENT DOCUMENTS

JP    H11-079516 A    3/1999
JP    2014-231398 A    12/2014

\* cited by examiner

*Primary Examiner* — Henok Shiferaw
(74) *Attorney, Agent, or Firm* — WORKMAN NYDEGGER

(57) ABSTRACT

The image reading device includes a reading section 5 for reading an image of a transported medium 3, a discharge section 9 for discharging the transported medium 3 in a discharge direction D, and a tapping member 11 for tapping a rear end portion 3e of the medium 3 discharged by the discharge section 9 downward. The tapping member 11 retreats from a discharge path 13 when the leading end portion 3t of the medium 3 is discharged to the discharge path 13 by the discharge section 9, and advances to the discharge path 13 when the rear end portion 3e of the medium 3 passes through the discharge section 9. The position P2 at which the tapping member 11 taps the medium 3 is a position that does not overlap the discharge section 9 in the discharge direction D.

14 Claims, 13 Drawing Sheets

IMAGE READING DEVICE WITH TAPPING MEMBER FOR TAPPING REAR END PORTION OF A MEDIUM

BACKGROUND

The present application is based on, and claims priority from JP Application Serial Number 2022-153443, filed Sep. 27, 2022, and JP Application Serial Number 2022-153444, filed Sep. 27, 2022, the disclosures of which are hereby incorporated by reference herein in their entirety.

1. Technical Field

The present disclosure relates to an image reading device including a medium discharge device.

2. Related Art

An example of this type of apparatus is described in JP-A-2014-231398. JP-A-2014-231398 describes the following problems. When sheets have a strong curling tendency, the sheets scatter before the sheets are stacked on the lower portion of a pressing member. When the sheets are pressed, if the pressing force is strong, then a new sheet may not be stacked on the lower portion of the pressing member due to obstruction by the already stacked sheets. As a countermeasure against the above-described problems, a guide member in which a pressing member is movable in a vertical direction is disclosed. Further, it is described that by making the guide member detachable, the pressing member can be used in any device regardless of the shape of the sheet discharge tray.

An example of this type of device is described in JP-A-11-79516. JP-A-11-79516 discloses a configuration in which a guide mechanism 17 for varying a discharge angle of discharged documents is provided, and the guide mechanism 17 is pivoted by driving a stepping motor 31.

In the structure according to JP-A-2014-231398, that is, in the structure in which the guide member is provided, a medium having low rigidity comes into contact with the guide member as a load, and there is a risk that the alignment property may deteriorate.

SUMMARY

In order to solve the above-described problems, an image reading device, according to the present disclosure, includes a reading section configured to read an image of a transported medium, a discharge section configured to discharge the transported medium in a discharge direction, and a tapping member configured to tap downward a rear end portion of the medium discharged by the discharge section.

DESCRIPTION OF EMBODIMENTS

Figure 1A:
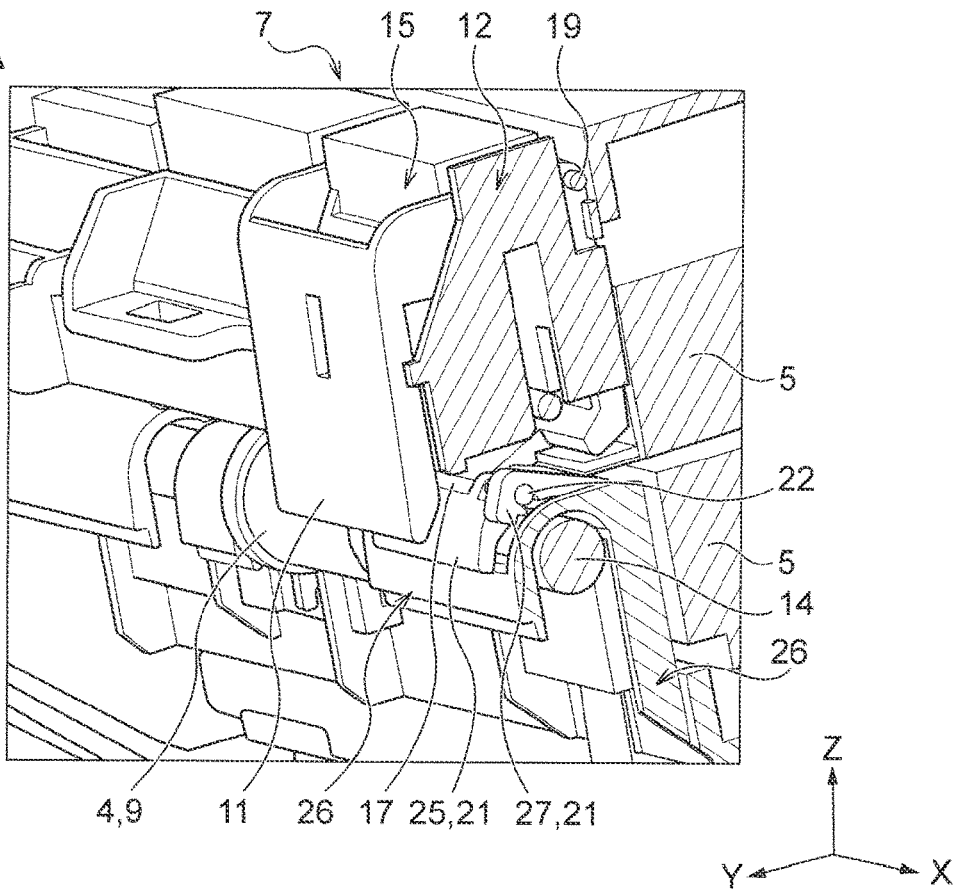
FIGS. 1A and 1B are main part perspective views showing an image reading device including a medium discharge device, according to a first embodiment.

The present disclosure will be described briefly.

In order to solve the above problems, an image reading device according to a first aspect of the present disclosure includes a reading section configured to read an image of a transported medium; a discharge section configured to discharge the transported medium in a discharge direction; and a tapping member configured to tap downward a rear end portion of the medium discharged by the discharge section.

According to this aspect, the tapping member taps, in the lower direction, the rear end portion of the medium discharged by the discharge section. As a result, it is possible to enhance the alignment property of the medium in the medium placement section or the like on which the discharged medium is placed.

The image reading device according to a second aspect of the present disclosure is an aspect according to the first aspect, wherein the tapping member is retracted from a discharge path when a leading end portion of the medium is discharged into the discharge path by the discharge section and, after the rear end portion of the medium passes through the discharge section, taps the rear end portion by advancing into the discharge path.

According to this aspect, the tapping member retreats when the leading end portion of the medium is discharged into the discharge path, and the tapping member taps the rear end portion by advancing into the discharge path when the rear end portion of the medium passes through the discharge section. That is, the tapping member does not come into contact with the medium while the medium is being transported by the discharge section or the like, and comes into contact with the medium when the rear end portion of the medium passes through the discharge section. As a result, even if the medium has low rigidity, it is possible to reduce the risk that clogging occurs at the leading end portion of the medium during transportation.

The image reading device according to a third aspect of the present disclosure is an aspect according to the first aspect, wherein the position at which the tapping member taps the medium is a position that does not overlap the discharge section in the discharge direction. Here, "does not overlap" in the phrase "the tapping position, at which the tapping member taps the medium, does not overlap the discharge section in the discharge direction" means that the position at which the tapping member taps the medium is located downstream of a region occupied by the discharge section with respect to the transport direction of the medium.

According to this aspect, the position at which the tapping member taps the medium is a position that does not overlap the discharge section in the discharge direction. Thus, there is little risk that the rear end portion of the medium tapped from above by the tapping member will contact the discharge section. That is, there is little risk that the rear end portion of the medium will come into contact with the discharge section and curl, or will continuously rub against the discharge section. Therefore, it is possible to more reliably drop the medium onto the medium placement section or the like.

The image reading device according to a fourth aspect of the present disclosure is an aspect according to any one of the first to third aspects, wherein the discharge section includes two roller pairs in a width direction, which intersects the discharge direction and the tapping member is located between the two roller pairs in the width direction.

According to this aspect, the tapping member is located between the two roller pairs in the width direction. Thus, since the medium is tapped from above by the tapping member in a state in which both sides of the medium are nipped by the two roller pairs, for example, even when the medium is a thin paper, the medium can be appropriately discharged to the medium placement section or the like.

The image reading device according to a fifth aspect of the present disclosure is an aspect according to the first aspect, further including a posture switching section configured to switch between a retracted posture, in which the tapping member is retracted from a discharge path of the medium, and an advanced posture, in which the tapping member is advanced into the discharge path, wherein the posture switching section has a contact portion that is located upstream of the tapping member in the discharge direction and comes into contact with the medium to be discharged, switches the tapping member to the retracted posture when the contact portion comes into contact with the medium, and switches the tapping member to the advanced posture when the contact portion is not in contact with the medium.

According to this aspect, the tapping member includes the posture switching section configured to switch between the retracted posture and the advanced posture. In addition, the posture switching section includes a contact portion that is located upstream of the tapping member in the discharge direction and comes into contact with the medium, switches the tapping member to the retracted posture when the contact portion comes into contact with the medium, and switches the tapping member to the advanced posture when the contact portion is not in contact with the medium. Thus, the structure can be simplified, and the tapping operation of the tapping member can be realized.

The image reading device according to a sixth aspect of the present disclosure is an aspect according to the fifth aspect, wherein a position where the contact portion and the medium come into contact with each other overlaps a part of the discharge section in the discharge direction.

According to this aspect, the position where the contact portion and the medium come into contact with each other overlaps a part of the discharge section in the discharge direction. With this configuration, when the medium is discharged by the discharge section, the rigidity of the medium in the transport direction is increased due to the contact of the contact portion, and thus it is possible to reduce the risk that the medium is folded or wrinkled. A position where the contact portion and the medium are in contact with each other should be downstream of a position where the discharge section nips the medium in the discharge direction.

The image reading device according to a seventh aspect of the present disclosure is an aspect according to either the fifth aspect or the sixth aspect, wherein the discharge section includes two roller pairs in a width direction, which intersects the discharge direction, and the contact portion is located between the two roller pairs in the width direction.

According to this aspect, the contact portion is located between the two roller pairs in the width direction. When the medium is nipped at both sides by the two roller pairs, the rigidity of the medium in the transport direction is increased. Accordingly, since the contact portion comes into contact with the medium in a state in which the rigidity of the medium is increased, it is possible to reduce the risk that folding or wrinkling occurs in the medium.

The image reading device according to an eighth aspect of the present disclosure is an aspect according to any one of the fifth to seventh aspects, wherein the posture switching section includes a rotation shaft and switches the posture of the tapping member by rotating about the rotation shaft and the rotation shaft is located, in the discharge direction, upstream of a position at which the contact portion and the medium come into contact with each other.

According to this aspect, the posture switching section rotates about the rotation shaft to switch the posture of the tapping member. Further, the rotation shaft is located, in the discharge direction, upstream of a position at which the contact portion and the medium come into contact with each other. Thus, the tapping operation of the tapping member can be easily realized. Further, since the rotation shaft is located at the position, it is possible to secure a wide pivot range in which the posture switching section pivots.

The image reading device according to a ninth aspect of the present disclosure is an aspect according to any one of the first to eighth aspects, further including a discharge angle changing section that comes into contact with a lower surface of the medium discharged by the discharge section and increases an angle in an upward direction at which the medium is discharged.

According to this aspect, the image reading device includes the discharge angle changing section that changes the angle, in an upward direction, at which the medium is discharged by a large amount by using the downward force received from the medium by coming into contact with the lower surface of the medium discharged by the discharge section as drive force. That is, since the discharge angle changing section increases the discharge angle of the medium to be discharged in an upward direction, the angle at which the medium to be discharged comes into contact with the medium placement surface of the medium placement section or the like is decreased. Thus, it is possible to reduce friction from contact between the medium and the medium placement surface.

The medium discharge device according to a tenth aspect of the present disclosure is an aspect according to the ninth aspect, wherein the discharge angle changing section includes the angle adjustment section configured to enter a projecting state, in which the angle adjustment section protrudes from a transport path along which the medium is transported and comes into contact with a lower surface of the medium, and a retracted state, in which the angle adjustment section is retracted from the transport path, a medium contact portion configured to pivot in a vertical direction and to come into contact with a lower surface of the medium being transported toward the discharge section, and a biasing member for biasing the angle adjustment section in a direction in which the angle adjustment section is retracted from the transport path, wherein the medium contact portion pivots downward against the biasing force of the biasing member by coming into contact with the medium and switches the angle adjustment section from the retracted state to the projecting state.

In this aspect, the discharge angle changing section includes the angle adjustment section, the medium contact portion, and the biasing member, and the medium contact portion pivots downward against the biasing force of the biasing member by the downward force received from the medium by coming into contact with the medium, and switches the angle adjustment section from the retracted state to the projecting state. The medium to be contacted by the medium contact portion is, for example, a thick paper having high rigidity or the thin paper having low rigidity. The thick paper has a large force to press the medium contact portion downward, but the thin paper has a smaller force to press the medium contact portion downward than the thick paper. In a case where the biasing force of the biasing member is the same as the downward force received from the medium, since the thick paper greatly lowers the medium contact portion against the biasing force, the amount of protrusion of the angle adjustment section in the projecting state increases. On the other hand, since the thin paper lowers the medium contact portion less than the thick paper, the amount of protrusion of the angle adjustment section in the projecting state becomes small. As described above, by providing the biasing member, the thick paper can be automatically discharged at a large discharge angle, and the thin paper can be automatically discharged at a small discharge angle. If the discharge angle of the thick paper is small, the thick paper may come into contact with the rear end of the medium which has been previously discharged onto the medium placement section and may push it forward, so the discharge angle of the thick paper should be large. On the other hand, if the discharge angle is large, the thin paper is subjected to air resistance and becomes difficult to be discharged, so that the discharge angle is desirably small. In this way, it is possible to change the protrusion amount of the angle adjustment section according to the rigidity such as the thickness of the medium, and it is possible to adjust the discharge angle to an appropriate discharge angle according to the rigidity of the medium.

The image reading device according to an eleventh aspect of the present disclosure is an aspect according to the ninth aspect or the tenth aspect, whereinafter the discharge angle changing section enters the retracted state, the tapping member taps the rear end portion of the medium when the rear end portion of the medium passes through the discharge section.

According to this aspect, after the discharge angle changing section is in the retracted state, the tapping member taps the medium when the rear end portion of the medium passes through the discharge section. As a result, the tapping member taps the medium after the rear end portion of the medium does not come into contact with the discharge angle changing section, and thus the medium can be more reliably dropped onto the medium placement section or the like.

The image reading device according to a twelfth aspect of the present disclosure is an aspect according to any one of the first aspect to the eighth aspect, wherein the tapping member is located downstream of the discharge section in the discharge direction.

According to this aspect, the tapping member is located downstream of the discharge section in the discharge direction. As a result, since the tapping member taps after the rear end portion of the medium has passed the nip position of the discharge section, the discharged medium can be effectively dropped to the medium placement section or the like, thereby enhancing the alignment property.

The image reading device, according to a thirteenth aspect of the present disclosure, is an aspect of the first aspect, further including a drive source configured to generate drive force for the discharge section, wherein the tapping member is retracted from a discharge path when a leading end portion of the medium is discharged into the discharge path by the discharge section, taps the rear end portion by advancing into the discharge path when the rear end portion of the medium passes through the discharge section, and enters the retracted state or the advancing state by drive force of the drive source.

According to the aspect, since the tapping member taps the rear end portion of the medium by the drive force of the drive source, it is possible to more reliably drop the medium onto the medium placement section or the like.

The image reading device according to a fourteenth aspect of the present disclosure is an aspect according to the first aspect, further including a discharge section configured to discharge the transported medium in a discharge direction, and a discharge angle changing section that increases a discharge angle at which the medium is discharged upward by coming into contact with a lower surface of the medium discharged by the discharge section.

According to the aspect, the discharge angle changing section can change the discharge angle of the medium to be increased upward by coming into contact with the lower surface of the medium discharged by the discharge section. That is, since the discharge angle of the medium is changed by contact with the medium without using a drive source such as a motor, it is possible to prevent the structure of the apparatus from being complicated. In addition, the discharge angle changing section can decrease the angle at which the medium to be discharged comes into contact with the medium placement surface of the medium placement section or the like by increasing the discharge angle of the medium to be discharged upward. Thus, it is possible to reduce friction from contact between the medium and the medium placement surface.

The medium discharge device according to a fifteenth aspect of the present disclosure is an aspect according to the fourteenth aspect, further including a discharge angle changing section includes the angle adjustment section configured to enter a projecting state, in which the angle adjustment section protrudes from a transport path along which the medium is transported and comes into contact with a lower surface of the medium, and a retracted state, in which the angle adjustment section is retracted from the transport path, and a medium contact portion configured to pivot in a vertical direction and to come into contact with a lower surface of the medium being transported toward the discharge section, wherein the medium contact portion pivots by contacting the medium to switch the angle adjusting section from the retracted state to the projecting state.

In this aspect, the discharge angle changing section includes the angle adjustment section and the medium contact portion, and the medium contact portion pivots downward by a downward force received from the medium by coming into contact with the medium, and changes the angle adjustment section from the retracted state to the projecting state. With this configuration, it is possible to change the discharge angle of the medium with a simple structure including the angle adjustment section and the medium contact portion.

The medium discharge device according to a sixteenth aspect of the present disclosure is an aspect according to the fifteenth aspect, wherein the discharge angle changing section includes a biasing member that biases the angle adjustment section in a direction in which the angle adjustment section is retracted from the transport path, and the medium contact portion pivots downward against the biasing force of the biasing member by coming into contact with the medium and switches the angle adjustment section from the retracted state to the projecting state.

The medium to be contacted by the medium contact portion is, for example, the thick paper having high rigidity or the thin paper having low rigidity. The thick paper has a large force to press the medium contact portion downward, but the thin paper has a smaller force to press the medium contact portion downward than the thick paper. In a case where the biasing force of the biasing member is the same as the downward force received from the medium, since the thick paper greatly lowers the medium contact portion against the biasing force, the amount of protrusion of the angle adjustment section in the projecting state increases. On the other hand, since, in case of the thin paper, the medium contact portion is moved down smaller than in the case of the thick paper, the amount of protrusion of the angle adjustment section in the projecting state becomes small. According to this aspect, by providing the biasing member, it is possible to automatically discharge the thick paper at a large discharge angle and discharge the thin paper at a small discharge angle. If the discharge angle of the thick paper is small, the thick paper may come into contact with the rear end of the medium which has been previously discharged onto the medium placement section and may push it forward, so the discharge angle of the thick paper should be large. On the other hand, if the discharge angle is large, the thin paper is subjected to air resistance and becomes difficult to be discharged, so that the discharge angle is desirably small. In this way, it is possible to change the protrusion amount of the angle adjustment section in accordance with the rigidity of the medium such as the thickness thereof, and it is possible to automatically adjust the discharge angle to an appropriate discharge angle in accordance with the rigidity of the medium.

The medium discharge device according to a seventeenth aspect of the present disclosure is an aspect according to the fifteenth aspect, wherein a position P3, at which the medium contact portion contacts the medium is further upstream in the discharge direction than a position P4 at which the angle adjustment section contacts the lower surface of the medium.

In this aspect, since the position P3 at which the medium contact portion comes into contact with the medium is on upstream of the position P4 at which the angle adjustment section comes into contact with the lower surface of the medium, it is possible to more reliably change the discharge angle.

The medium discharge device according to an eighteenth aspect of the present disclosure is an aspect according to the fifteenth aspect, wherein the discharge section includes two roller pairs in a width direction, which intersects the discharge direction, and the discharge angle changing section is positioned between the two roller pairs in the width direction.

In this aspect, the discharge angle changing section is located between the two roller pairs in the width direction. When the medium is nipped at both sides by the two roller pairs, the rigidity of the medium in the transport direction is increased. With this configuration, since the discharge angle changing section performs an operation of changing the discharge angle of the medium in a state where the rigidity of the medium is increased, it is possible to reduce the risk that the medium folds or wrinkles. The area between the two roller pairs can be effectively utilized.

The medium discharge device according to a nineteenth aspect of the present disclosure is an aspect according to the eighteenth aspect, wherein a position P4 at which the angle adjustment section comes into contact with the medium may be located downstream of a nip position of the roller pair in the discharge direction.

When the medium is nipped at both sides by the two roller pairs, the rigidity of the medium in the transport direction is increased. According to the aspect, since the position P4 where the angle adjustment section comes into contact with the medium is located downstream of the nip position of the roller pair in the discharge direction, the angle adjustment section comes into contact with the lower surface of the medium in a state where the rigidity of the medium is increased. Therefore, it is possible to suppress the leading end portion of the medium from being folded or jammed.

The medium discharge device according to a twentieth aspect of the present disclosure is an aspect according to a fifteenth aspect, wherein when the angle adjusting member separates from the medium, the angle adjustment member enters a retracted state in which the angle adjusting member retracts from the transport path along which the medium is transported, and after the discharge angle changing section enters the retracted state, the tapping member taps the rear end portion of the medium when the rear end portion of the medium passes through the discharge section.

According to this aspect, after the discharge angle changing section is in the retracted state, the tapping member taps the medium when the rear end portion of the medium passes through the discharge section. As a result, the tapping member taps the medium after the rear end portion of the medium does not come into contact with the discharge angle changing section, and thus the medium can be more reliably dropped onto the medium placement section or the like.

EMBODIMENTS

Hereinafter, a medium discharge device according to each embodiment of the disclosure and an image reading device including the medium discharge device will be described in detail with reference to the drawings. In the following description, three axes orthogonal to each other are referred to as an X-axis, a Y-axis, and a Z-axis, respectively, as shown in each figure. The direction indicated by the arrows of the three axes (X-axis, Y-axis, and Z-axis) is the "+" direction of each direction, and the reverse is the "−" direction. The Z-axis direction corresponds to a vertical direction that is a direction in which gravity acts. A +Z direction indicates a vertically upward direction, and a −Z direction indicates a vertically downward direction. The X-axis direction and the Y-axis direction correspond to horizontal directions. The +Y direction indicates the front direction of the apparatus, and the −Y direction indicates the rear direction of the apparatus. The +X direction indicates the right direction of the device, and the −X direction indicates the left direction of the device.

First Embodiment

Overall Configuration of Image Reading Device

An image reading device 1 according to the first embodiment is a scanner configured to read an image on a medium. Here, the image means what is visually recorded on the medium, and is, for example, a character, a figure, a table, a picture, a photograph, or the like. The medium is not limited to a sheet, and may be a card, a booklet, or the like. As shown in FIGS. 1A, 1B, 10A, and 11, the image reading device 1 includes a reading section 5 configured to read an image of a medium 3, and a medium discharge device 7. The medium discharge device 7 includes a discharge section 9 that discharges, in the discharge direction D, the medium 3 transported in a transport direction F in a transport path 2 from upstream of the reading section 5, and a tapping member 11 that taps downward a rear end portion 3e of the medium 3 discharged in the discharge direction D by the discharge section 9. In this specification, the transport path 2 includes not only a portion upstream of the discharge section 9 but also a portion downstream of the discharge section 9, that is, the discharge path D. In the transport path 2, other structural members such as the transporting roller pair for applying a transporting force to the medium 3 are arranged upstream of the reading section 5 in the same manner as in an ordinary scanner. Here, the illustration and description thereof are omitted.

Medium Discharge Device

Figure 10A:
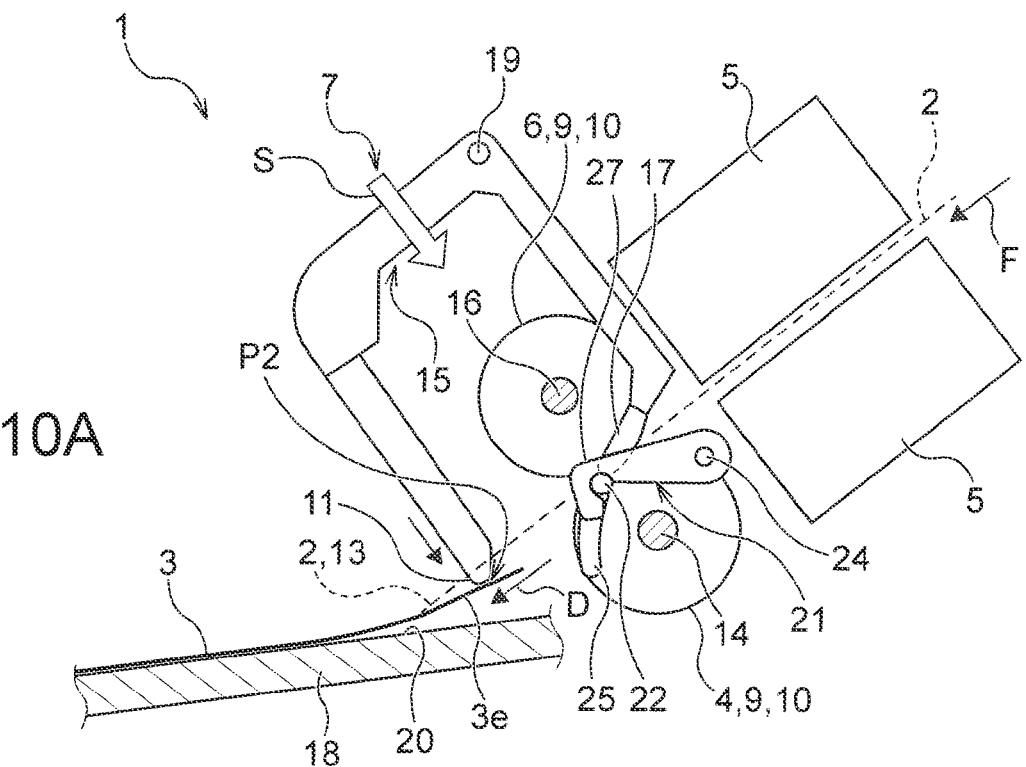
FIG. 10A is a side cross-sectional view of a main portion for explaining the operation of the medium discharge device of the first embodiment.
Figure 11:
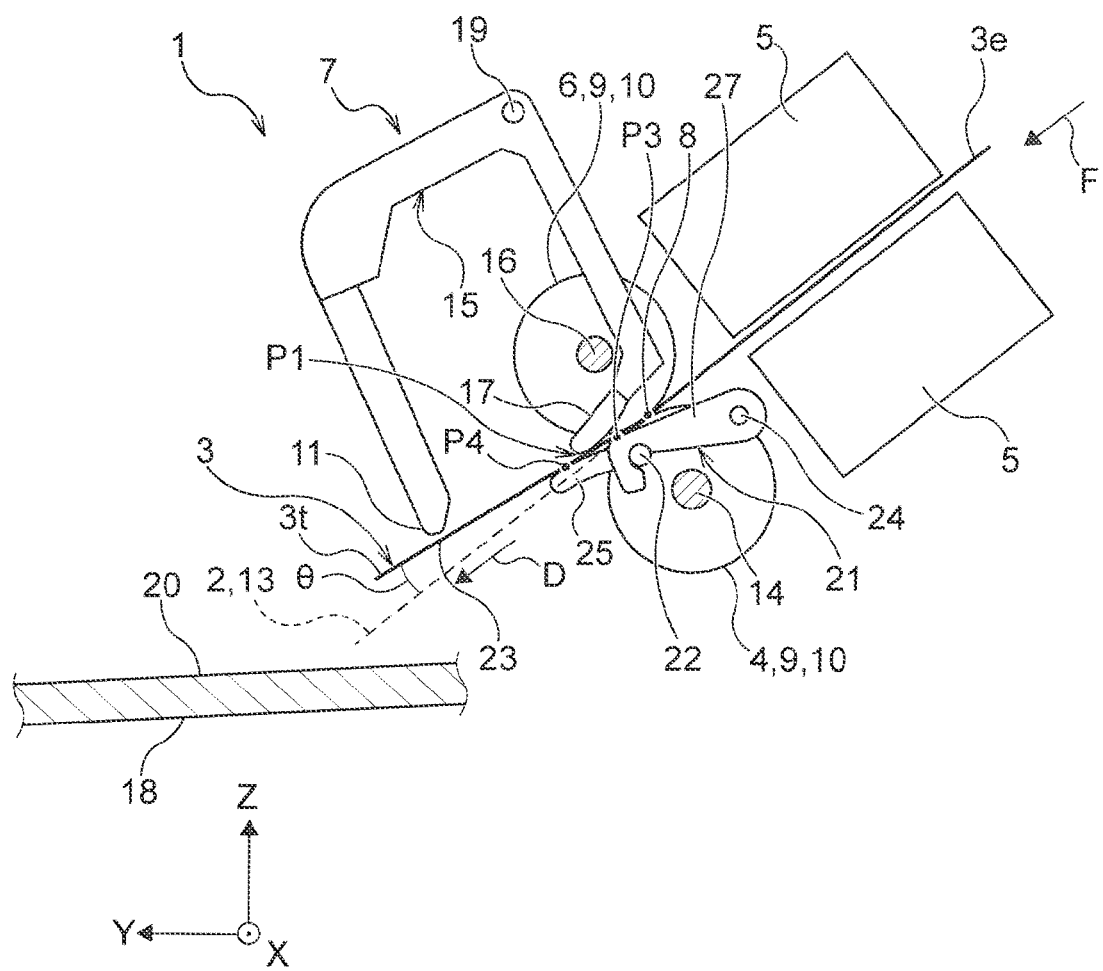
FIG. 11 is a side cross-sectional view of a main part for explaining an operation of the medium discharge device of the first embodiment.

As illustrated in FIGS. 1A, 1B, 10A, and 11, the medium discharge device 7 of the present embodiment, as mentioned above, includes the discharge section 9 that discharges the medium 3 transported from upstream the transport direction F in the discharge direction D and the tapping member 11 that taps downward the rear end portion 3e of the medium 3 discharged by the discharge section 9. Here, as shown in FIGS. 10A and 11, the tapping member 11 is located downstream of the discharge section 9 in the discharge direction D. The discharge section 9 is constituted by a roller pair 10 consisting of a discharge drive roller 4 and a discharge driven roller 6. The discharge section 9 nips the medium 3 with the pair of the discharge drive roller 4 and the discharge driven roller 6, and discharges the medium 3 in the discharge direction D. In FIGS. 10A and 11, reference numeral 14 denotes a rotation shaft of the discharge drive roller 4, reference numeral 16 denotes a rotation shaft of the discharge driven roller 6, and reference numeral 8 (shown in FIG. 11) denotes a nip point. Further, reference numeral 18 denotes a medium placement section on which the medium 3 is placed, and reference numeral 20 denotes a medium placement surface, and the medium 3 discharged from the discharge section 9 is placed on the medium placement surface 20 of the medium placement section 18.

Tapping Member

Figure 1B:
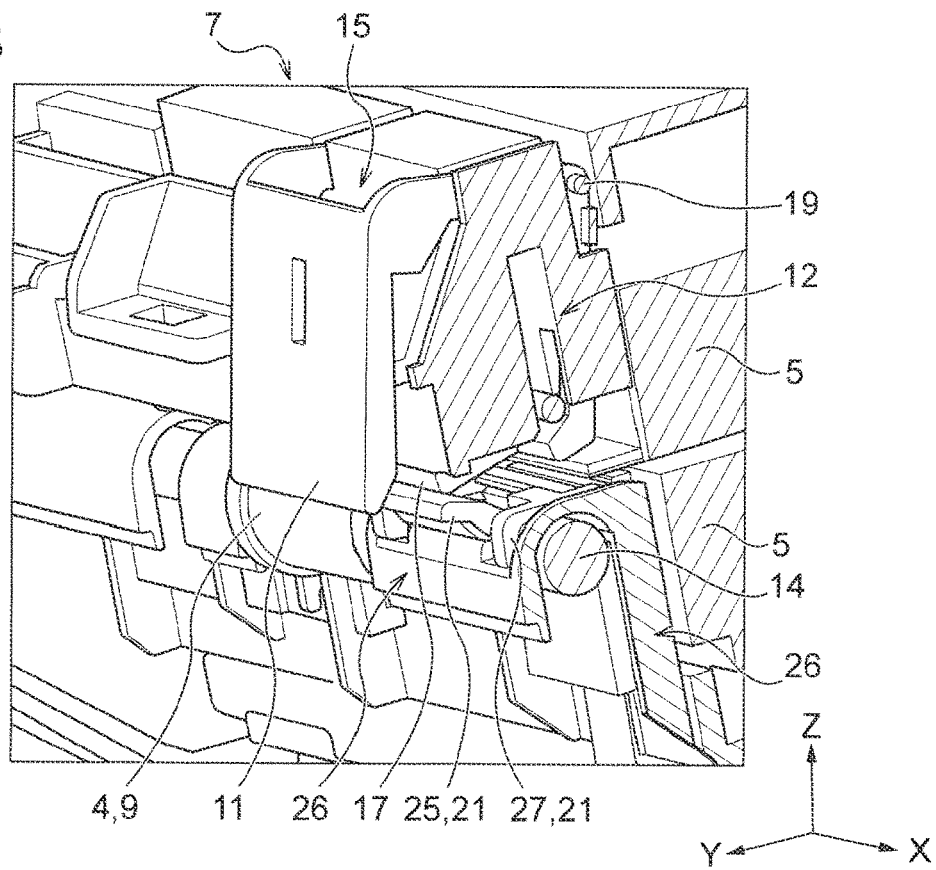

The structure of the tapping member 11 will be described with reference to FIGS. 1A to 3B and FIGS. 10A to 11. As illustrated in FIGS. 1B and 11, the tapping member 11 retreats away from a discharge path 13 when a leading end portion 3t of the medium 3 is discharged to the discharge path 13 by the discharge section 9. On the other hand, when the rear end portion 3e of the medium 3 passes through the discharge section 9, the tapping member 11 advances into the discharge path 13 as shown in FIGS. 1A and 10A, and taps the rear end portion 3e while advancing. In FIGS. 1A and 1B, the medium 3 is not shown.

In the present embodiment, the medium discharge device 7 includes a posture switching section 15. The posture switching section 15 is switchable between a retracted posture (shown in FIGS. 11 and 1B) in which the tapping member 11 is retracted from the discharge path 13 of the medium 3 and an advanced posture (shown in FIGS. 10A and 1A) in which the tapping member 11 is advanced into the discharge path 13. In the present embodiment, the posture switching section 15 is provided with a contact portion 17 which is located upstream of the tapping member 11 in the discharge direction D and is in contact with the upper surface of the medium 3 to be discharged. Then, when the contact portion 17 comes into contact with the medium 3, the tapping member 11 is switched to the retracted posture (shown in FIG. 11). On the other hand, when the contact portion 17 is not in contact with the medium 3, the tapping member 11 is switched to the advanced posture (shown in FIG. 10A).

Further, the posture switching section 15 has a rotation shaft 19, and the posture of the tapping member 11 can be switched between the retracted posture (shown in FIG. 11) and the advanced posture (shown in FIG. 10A) by rotating with respect to the rotation shaft 19. The rotation shaft 19 is provided upstream with respect to the discharge direction D from a position P1 wherein the contact portion 17 and the medium 3 contact each other. Further, as shown in FIG. 11, the position P1 where the contact portion 17 and the medium 3 contact each other overlaps with a part of the discharge section 9 in the discharge direction D. Here, the position P1 is set within each of the regions occupied by the roller pair 10 of the discharge drive roller 4 and the discharge driven roller 6 in the discharge direction D. In other words, the position P1 is within the range of the diameters of the discharge drive roller 4 and the discharge driven roller 6. Furthermore, as shown in FIG. 10A, a position P2 where the tapping member 11 taps the medium 3 is a position that does not overlap with the discharge section 9 in the discharge direction D. As a result, after the rear end portion 3e of the medium 3 passes the discharge section 9, the tapping member 11 can tap the rear end portion 3e of the medium 3.

Figure 10B:
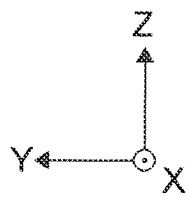
FIG. 10B is an enlarged view of a main portion of a discharge section for explaining the operation of the medium discharge device of the first embodiment.
Figure 10B:
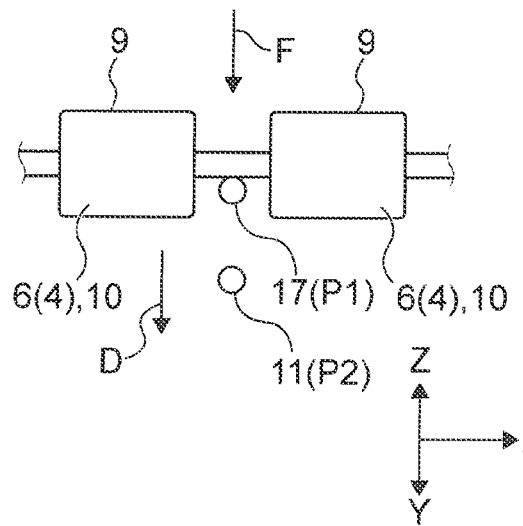

As shown in the enlarged schematic diagram in FIG. 10B, in the present embodiment, the discharge section 9 includes two roller pairs 10 and 10 in the width direction (X-axis direction), which intersects with the discharge direction D. The tapping member 11 is configured to be positioned between the two roller pairs 10 and 10 in the width direction (X-axis direction). Further, also the contact portion 17 is configured so as to be positioned between the two roller pairs 10 and 10 in the width direction (X-axis direction). When a plurality of sets of two roller pairs 10 and 10 are provided in the width direction (X-axis direction), it is desirable to similarly dispose the contact portions 17 between the other two roller pairs 10 and 10. Here, the enlarged schematic diagram FIG. 10B is a view drawn by viewing the discharge section 9 as viewed in the direction of the arrow S in FIG. 10A.

Figure 2A:
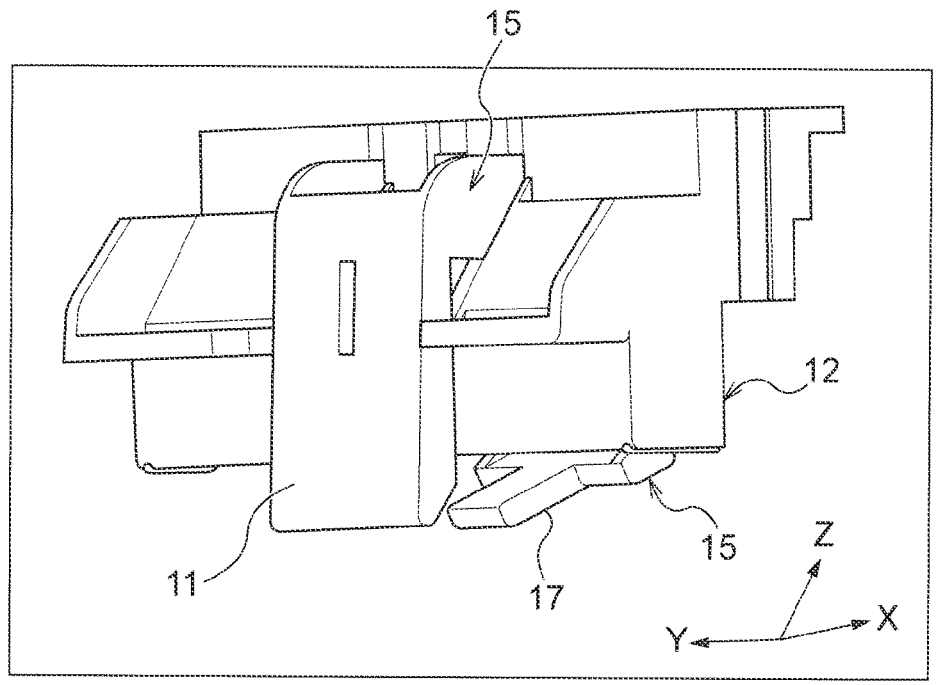
FIG. 2A is a perspective view showing a portion of a tapping member of the first embodiment.
Figure 2B:
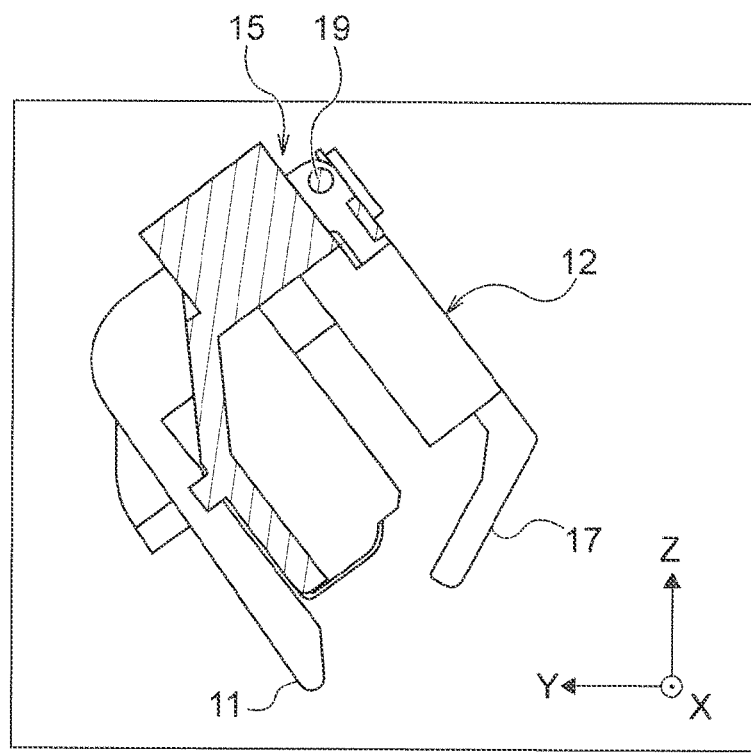
FIG. 2B is a side sectional view showing the portion of the tapping member of the first embodiment.
Figure 3A:
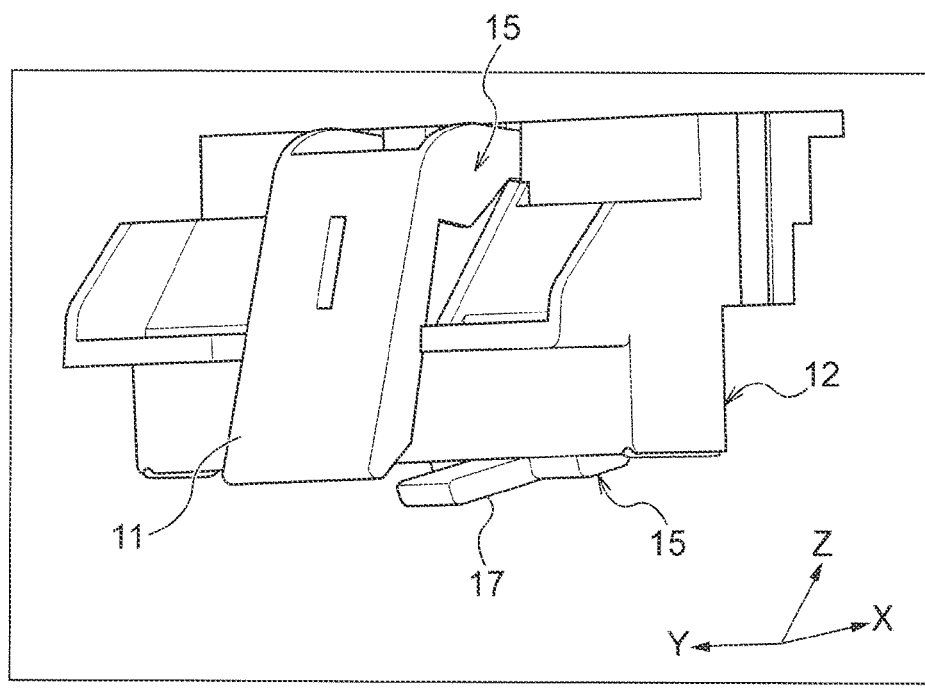
FIG. 3A is a perspective view from the same side as FIG. 2A in a state different from FIG. 2A.
Figure 3B:
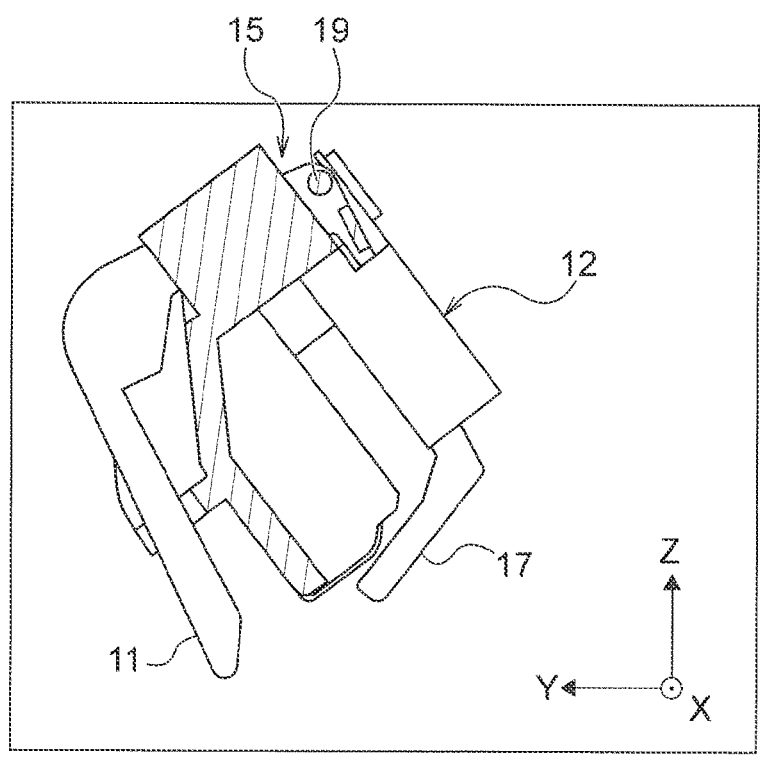
FIG. 3B is a cross-sectional view from the same side as FIG. 2B in a state different from FIG. 2B.

FIGS. 2A to 3B are perspective views (A) and side sectional views (B), in which only a portion of the tapping member 11 is drawn. FIGS. 2A and 2B show the state of the advanced posture shown in FIGS. 1A and 10A. FIGS. 3A and 3B show the state of the retracted posture shown in FIGS. 1B and 11. In the present embodiment, the tapping member 11 is integrally formed with the posture switching section 15, which has the contact portion 17. Note that the tapping member 11 and the posture switching section 15 may be formed separately from or integrally with each other. The posture switching section 15 is rotatably held on the first holder 12 by the rotation shaft 19. As shown in FIGS. 1A and 1B, the posture switching section 15 is attached to the discharge section 9 of the medium discharge device 7 via the first holder 12. The posture of the tapping member 11 can be switched between the retracted posture (shown in FIG. 11) and the advanced posture (shown in FIG. 10A) by the posture switching section 15 rotating about the rotation shaft 19 as a rotation fulcrum.

Discharge Angle Changing Section

As shown in FIGS. 1A, 1B, 4A, 4B, 5A, 5B, 10A, and 11, in the present embodiment, the medium discharge device 7 includes the discharge section 9 for discharging the transported medium 3 in the discharge direction D, and a discharge angle changing section 21 for contacting a lower surface 23 of the medium 3 discharged by the discharge section 9 and increasing the discharge angle θ (shown in FIG. 11) at which the medium 3 is discharged in the direction. The discharge angle θ is an angle formed by a virtual line obtained by extending the transport path 2 and a direction in which the medium is discharged by the discharge section 9. The discharge angle θ also may be an angle formed by a virtual line obtained by extending a reading path in which the reading section 5 is provided and a direction in which the medium is discharged by the discharge section 9. The discharge angle changing section 21 includes an angle adjustment section 25 and a medium contact portion 27. The angle adjustment section 25 can enter a projecting state (shown in FIGS. 11 and 1B) in which the angle adjustment section 25 protrudes from the transport path 2 along which the medium 3 is transported and comes into contact with the lower surface 23 (shown in FIG. 11) of the medium 3, and a retracted state (shown in FIGS. 10A and 1A) in which the angle adjustment section 25 retracts from the transport path 2. The medium contact portion 27 is rotatable in the vertical direction, and is disposed so as to come into contact with the lower surface 23 of the medium 3 which is transported toward the discharge section 9. The medium contact portion 27 is rotatable in the vertical direction about a shaft 24 as a pivot fulcrum. The angle adjustment section 25 is connected to the medium contact portion 27 via a shaft 22 so that the free end of the angle adjustment section 25 is freely rotatable. When the lower surface 23 of the medium 3 comes into contact with the medium contact portion 27, the medium contact portion 27 is pivoted downward about the shaft 24 as a pivot fulcrum, and the free end of the angle adjustment section 25 is pivoted upward by the downward rotation. As a result, the angle adjustment section 25 can be switched from the retracted state (shown in FIG. 10A) to the projecting state (shown in FIG. 11).

In the present embodiment, the discharge angle changing section 21 includes a biasing member 29 (shown in FIGS. 4A to 5B) that biases the angle adjustment section 25 in a direction in which the angle adjustment section 25 is retracted from the transport path 2. The medium contact portion 27 is configured to rotate downward against the biasing force of the biasing member 29 by coming into contact with the lower surface 23 of the medium 3, thereby switching the angle adjustment section 25 from the retracted state (shown in FIG. 10A) to the projecting state (shown in FIG. 11). Here, a torsion spring is used as the biasing member 29, but the biasing member 29 is not limited to this. A tension spring, a compression spring, or the like may be used as long as it can perform the same function. The position where the biasing member 29 is provided is not limited to the above-described position. Any position may be used as long as the biasing force as the biasing member 29 acts in the same manner as described above. The position P3, where the medium contact portion 27 contacts the medium 3, is upstream in the discharge direction D of the position P4, where the angle adjustment section 25 contacts the lower surface 23 of the medium 3. Here, as shown in FIG. 11, the position P4, where the angle adjustment section 25 contacts the medium 3, is located downstream of the nip point 8 of the roller pair 10 in the discharge direction D.

Figure 4A:
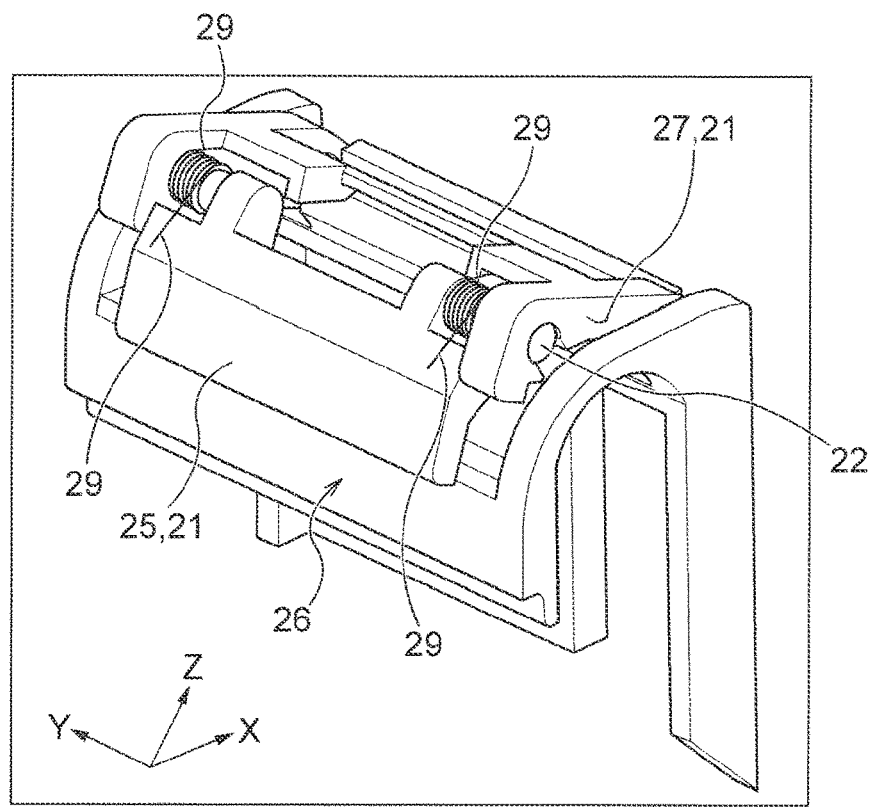
FIG. 4A is a perspective view showing a portion of the discharge angle changing section according to the first embodiment.
Figure 4B:
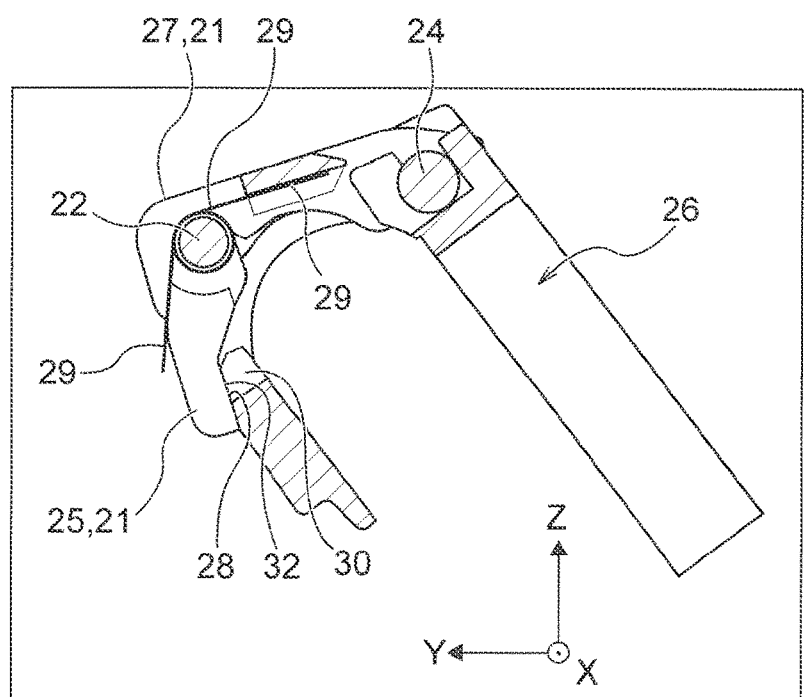
FIG. 4B is a side sectional view showing a portion of the discharge angle changing section according to the first embodiment.
Figure 5A:
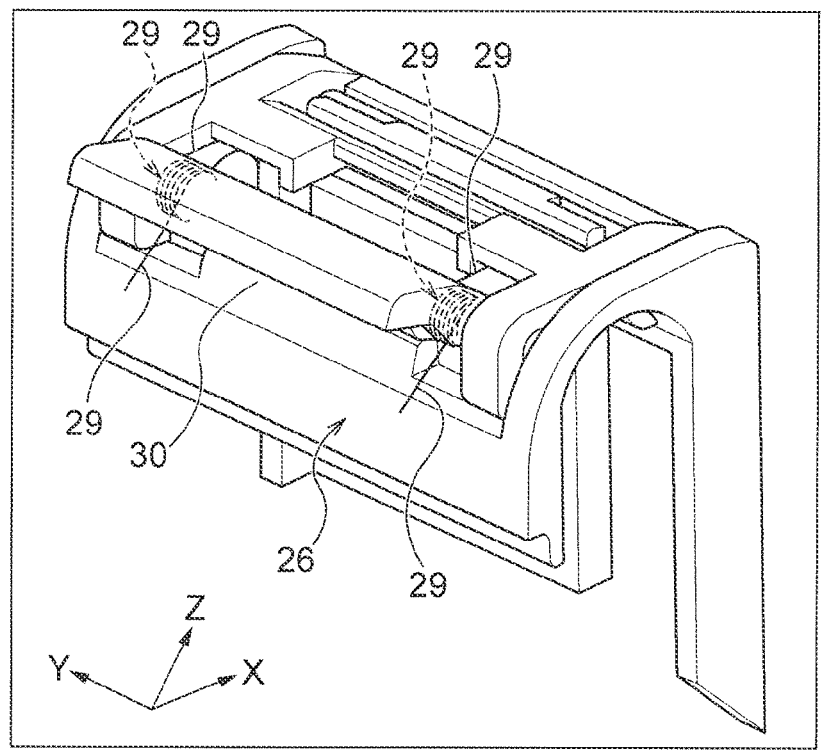
FIG. 5A is a perspective view from the same side as FIG. 4A in a state different from that of FIG. 4A.
Figure 5B:
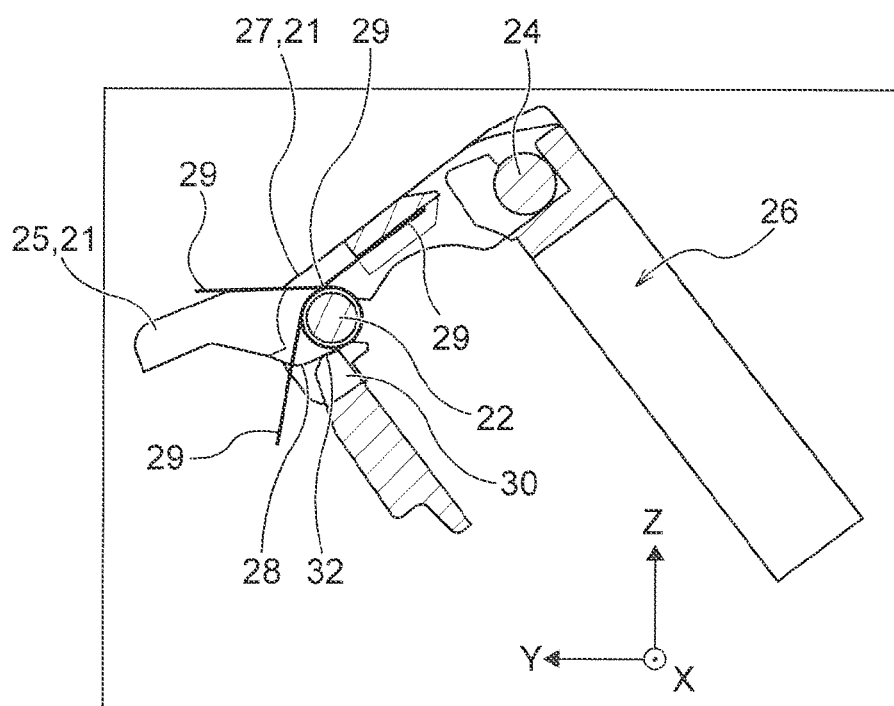
FIG. 5B is a cross-sectional view from the same side as FIG. 4B in a state different from that of FIG. 4B.

FIGS. 4A to 5B are perspective views (A) and side sectional views (B) in which only a portion of the discharge angle changing section 21 is drawn. FIGS. 4A and 4B show the state of the retracted posture shown in FIGS. 1A and 10A. FIGS. 5A and 5B show a state of the advanced posture shown in FIGS. 1B and 11. In the present embodiment, in the discharge angle changing section 21, the base end of the medium contact portion 27 is pivotably held on a second holder 26 by the shaft 24. As shown in FIGS. 1A and 1B, the discharge angle changing section 21 is attached to a portion of the discharge section 9 of the medium discharge device 7 via the second holder 26.

When the medium contact portion 27 in the state shown in FIGS. 4A and 4B comes into contact with the lower surface of the leading end portion 3t of the transported medium 3, the medium contact portion 27 pivots downward about the shaft 24 as a pivot fulcrum, and the shaft 22, which is located at the free end of the medium contact portion 27 and to which the base end of the angle adjustment section 25 is pivotably connected, moves downward. When the shaft 22 moves downward, a contact point 32, which is a portion of a back surface 28 of the angle adjustment section 25 that is in contact with a guided portion 30 of the second holder 26, moves while remaining in the contact state. From this, the free end of the angle adjustment section 25 pivots upward with the shaft 22 as a pivot fulcrum. By this series of operations, the angle adjustment section 25 is switched from the retracted state (shown in FIGS. 10A, 4A and 4B) to the projecting state (shown in FIGS. 11, 5A and 5B). Further, when the rear end portion 3e of the medium 3 is discharged from the discharge section 9, the lower surface 23 no longer contacts the medium 3, so the medium contact portion 27 is released from the downward pushing force produced by contact with the medium 3. In this state, the free end of the angle adjustment section 25 is pivoted downward by the restoring operation of the biasing force of the biasing member 29, and the shaft 22 moves upward. Since the base end of the medium contact portion 27 is fixed in the vertical direction by the shaft 24, the shaft 22 moves upward as described above. Then, the state returns to the projecting state (shown in FIGS. 10A, 5A and 5B).

Figure 6A:
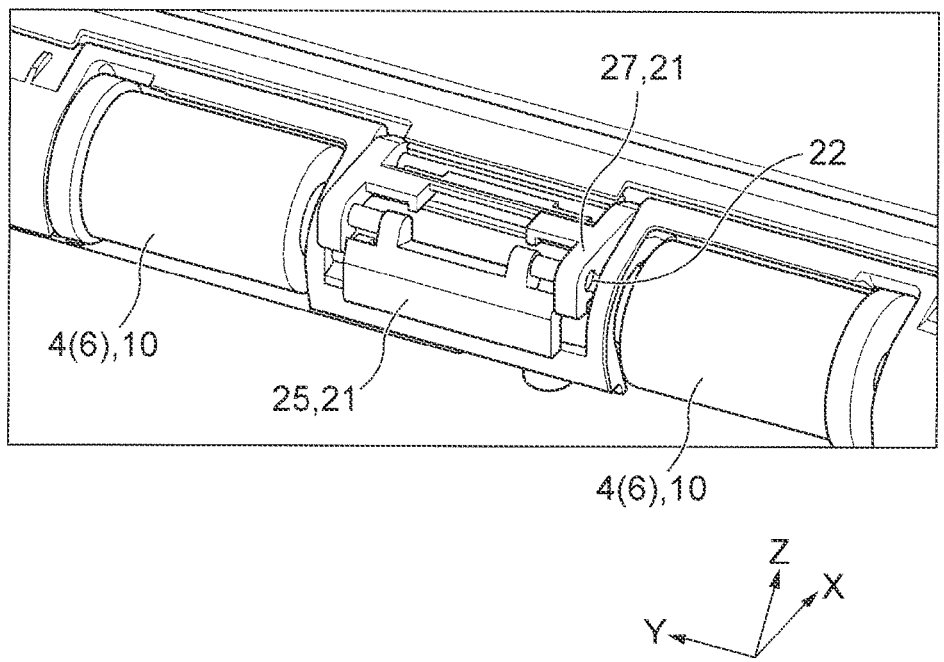
FIGS. 6A and 6B are main part perspective views showing a discharge angle changing section and a discharge section in the first embodiment.
Figure 6B:
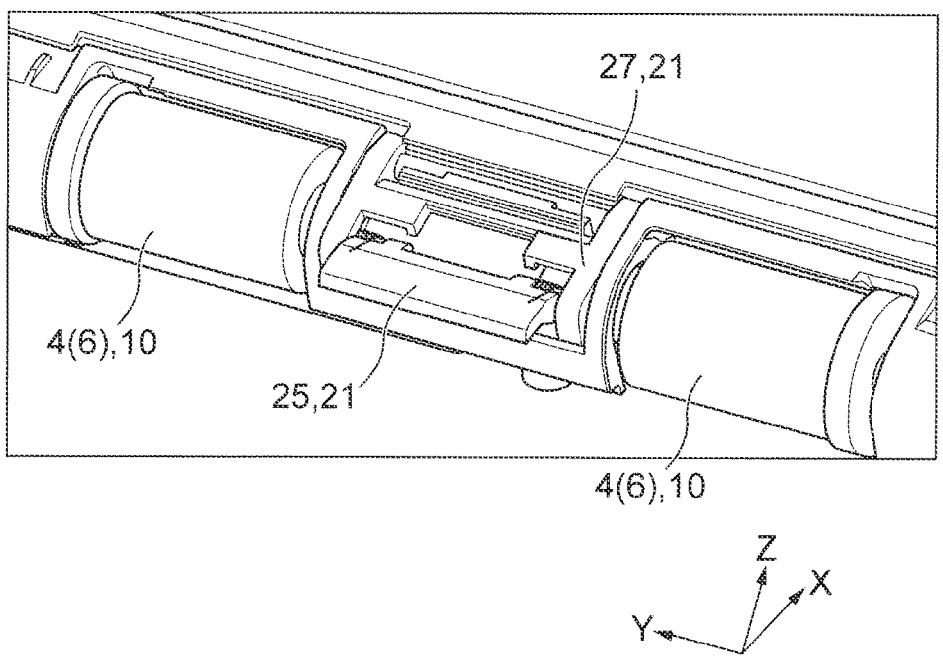

As shown in FIGS. 6A and 6B, the discharge section 9 includes two roller pairs 10 and 10 in the width direction (X-axis direction) intersecting the discharge direction D. The discharge angle changing section 21 is configured to be positioned between the two roller pairs 10 and 10 in the width direction (X-axis direction). That is, the angle adjustment section 25 and the medium contact portion 27 are positioned between the two roller pairs 10 and 10. When a plurality of sets of the two roller pairs 10 and 10 are provided in the width direction (X-axis direction), the discharge angle changing section 21 should be similarly disposed between the other two roller pairs 10 and 10.

Thick Paper and Thin Paper

Figure 7A:
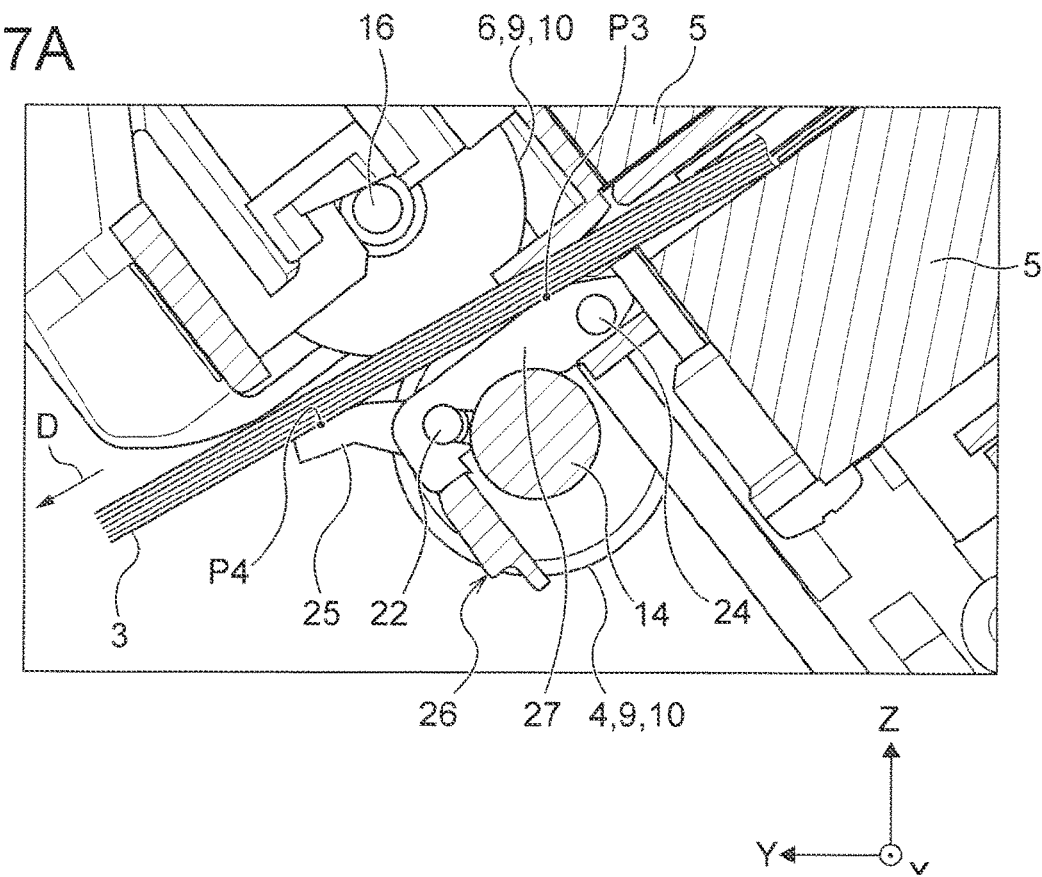
FIGS. 7A and 7B are side sectional views for explaining operations of the discharge angle changing section in the first embodiment.

Based on FIGS. 7A and 7B, the operation of the discharge angle changing section 21 when the thick paper having high rigidity and the thin paper having low rigidity are transported and discharged as the medium will be described. FIG. 7A shows a state where the medium 3 of the thick paper is discharged from the discharge section 9. When the lower surface 23 of the leading end portion 3t of the medium 3 comes into contact with the medium contact portion 27, the medium contact portion 27 pivots downward against the biasing force of the biasing member 29 about the shaft 24 as a pivot fulcrum. The downward pivoting of the medium contact portion 27 simultaneously pivots the angle adjustment section 25 upward against the biasing force of the biasing member 29. As a result, a part of the free end of the angle adjustment section 25 comes into contact with the lower surface 23 of the medium 3. At this time, when the medium 3 is the thick paper, since the force of pressing the medium contact portion 27 downward is larger than that of the thin paper, the downward pivoting angle of the medium contact portion 27 increases. When the pivoting angle is large, the angle at which the angle adjustment section 25 is pivoted upward is also large, and thus the medium 3 is discharged in a state where the discharge angle θ (shown in FIG. 11) is large.

Figure 7B:
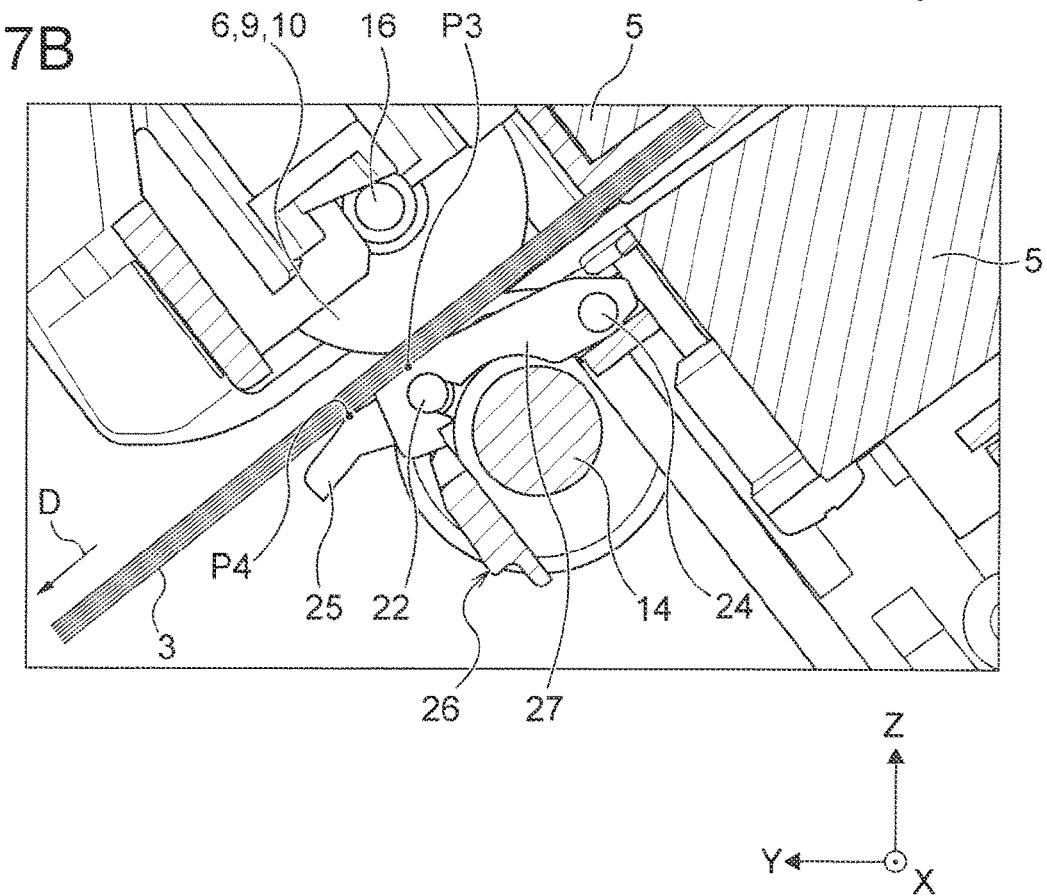

On the other hand, as shown in FIG. 7B, in the case where the medium 3 is the thin paper, the force of pushing the medium contact portion 27 downward is smaller than that of the thick paper, so that the pivoting angle of the medium contact portion 27 downward becomes smaller accordingly. When the pivoting angle is small, the angle at which the angle adjustment section 25 is pivoted upward is also small, and the medium 3 is discharged in a state where the discharge angle θ (shown in FIG. 11) is small. As described above, by appropriately setting the biasing force of the biasing member 29, the discharge angle θ of the medium 3 can be automatically changed to an appropriate angle for the thick paper and an appropriate angle for the thin paper.

Modification Example of Discharge Angle Changing Section

Figure 8A:
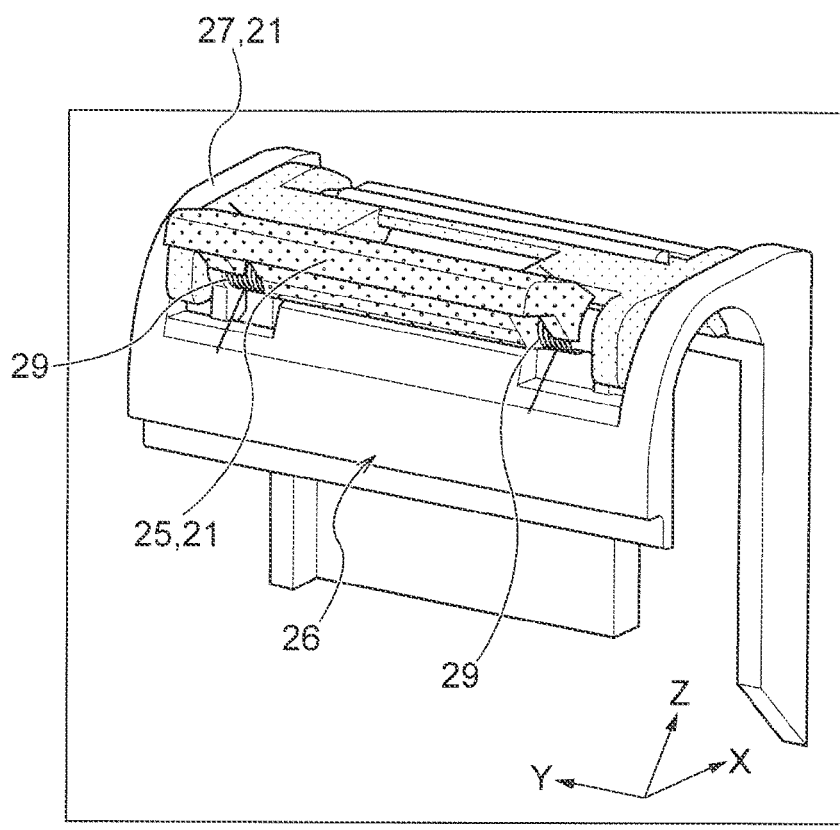
FIG. 8A is a perspective view showing a modification of the discharge angle changing section of the first embodiment.
Figure 8B:
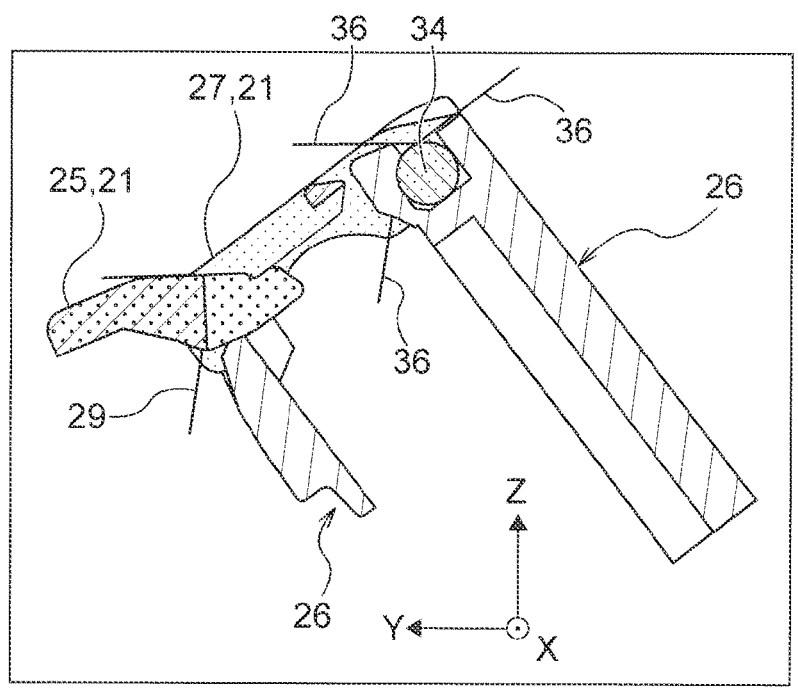
FIG. 8B is a side cross-sectional view showing a modification of the discharge angle changing section of the first embodiment.
Figure 9A:
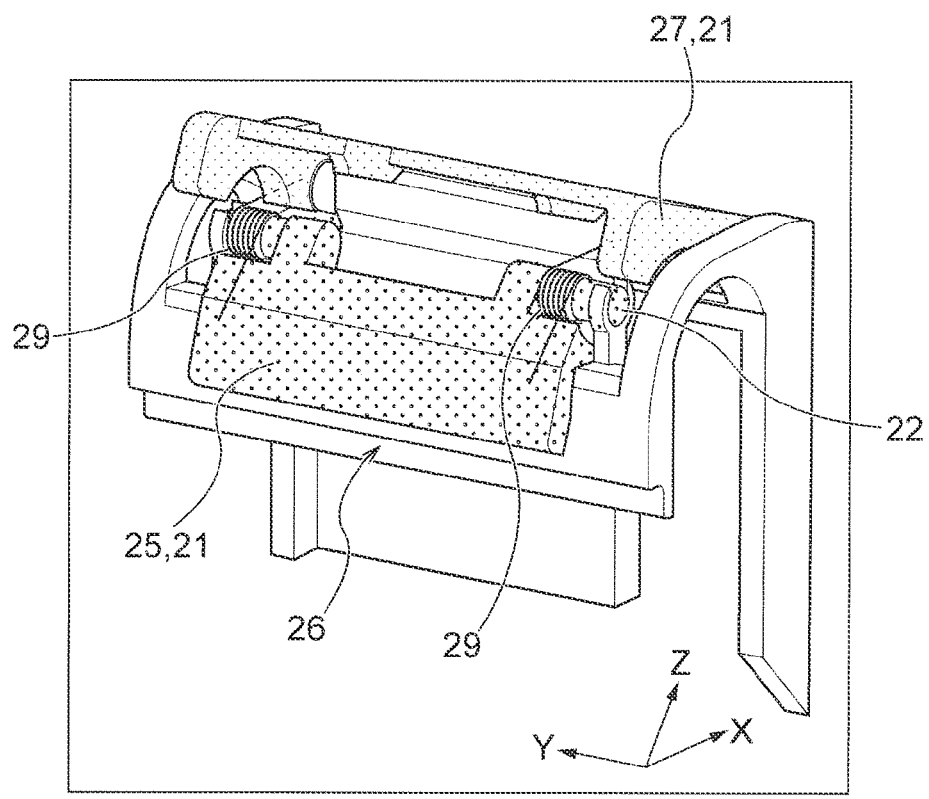
FIG. 9A is a perspective view from the same side as FIG. 8A in a state different from that of FIG. 8A.
Figure 9B:
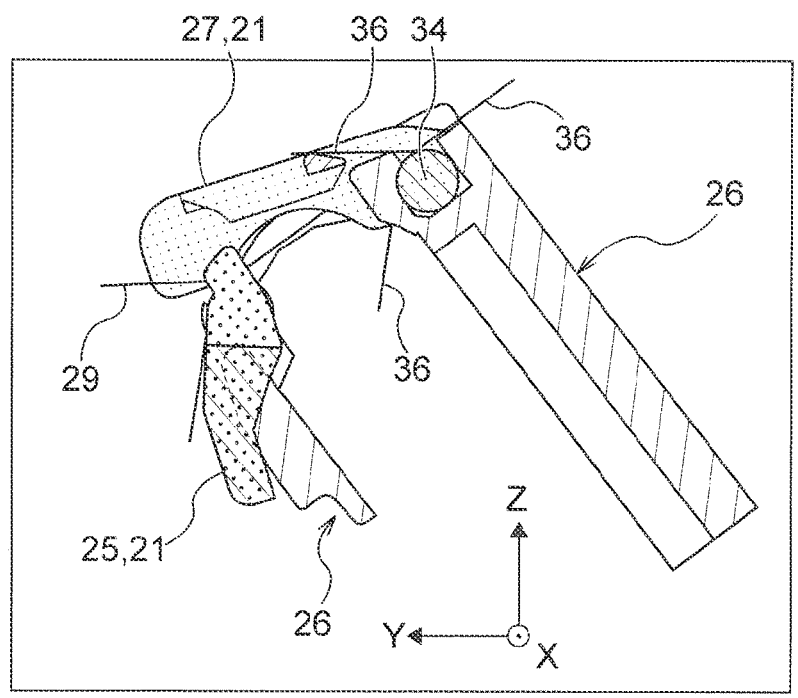
FIG. 9B is a cross-sectional view from the same side as FIG. 8B in a state different from that of FIG. 8B.

FIGS. 8A to 9B show a modification of the discharge angle changing section 21. In the discharge angle changing section 21 of this modified example, the angle adjustment section 25 and the medium contact portion 27 are formed separately. The angle adjustment section 25 is configured such that the shaft 22 is attached to the second holder 26 and the free end of the angle adjustment section 25 pivots upward and downward about the shaft 22 as a pivot fulcrum. The medium contact portion 27 is configured such that a shaft 34 is attached to the second holder 26, and the free end of the medium contact portion 27 pivots upward and downward about the shaft 34 as a pivot fulcrum. Here, a biasing member 36 is also provided at the portion of the shaft 34. The biasing direction of the biasing member 36 is a direction in which the free end of a medium supporting section 27 moves upward until the free end of the medium supporting section 27 reaches the state illustrated in FIGS. 1A, and 9A to 10A, which is a position intersecting the transport path 2. Here, a torsion spring is used as the biasing member 36, but the biasing member 36 is not limited to this. A tension spring, a compression spring, or the like may be used as long as it can perform the same function. The position where the biasing member 36 is provided is not limited to the above-described position. Any position may be used as long as the biasing force as the biasing member 36 acts in the same manner as described above. When the medium contact portion 27 in the state of FIGS. 9A and 9B comes into contact with the lower surface 23 of the transported medium 3, the free end of the medium contact portion 27 pivots downward and moves. Then, the free end of the medium contact portion 27 pushes the base end of the angle adjustment section 25 downward from above. As a result, the free end of the angle adjustment section 25 is pivoted upward against the biasing force of the biasing member 29, and the state shown in FIGS. 8A and 8B is obtained, and this state is maintained.

Description of Operation of First Embodiment

In the state where the tapping member 11 is in the advanced posture shown in FIG. 10A, when the medium 3 is transported from upstream where the reading section 5 is located and the leading end portion 3t thereof reaches the region of the discharge section 9, the upper surface of the medium 3 comes into contact with the contact portion 17 of the posture switching section 15 from below. When the medium 3 is further transported, the contact portion 17 is lifted upward. As a result, the posture switching section 15 is rotated clockwise about the rotation shaft 19, so that the tapping member 11 is moved upward to take the retracted posture shown in FIG. 11. When the medium 3 is discharged in the discharge direction D by the discharge section 9 and the rear end portion 3e of the medium 3 passes through the discharge section 9, there is nothing to lift up the contact portion 17, and the contact portion 17 moves downward. As a result, since the posture switching section 15 rotates counterclockwise about the rotation shaft 19 as a fulcrum, the tapping member 11 moves downward and shifts to the state of the advanced posture shown in FIG. 11. That is, the tapping member 11 taps the rear end portion 3e of the medium 3 downward.

In the present embodiment, the medium discharge device 7 also includes the discharge angle changing section 21. In a state in which the angle adjustment section 25 of the discharge angle changing section 21 is in the retracted state shown in FIG. 10A and the medium contact portion 27 is in a position intersecting the transport path 2, when the medium 3 is transported from upstream and the leading end portion 3t thereof reaches the region of the discharge section 9, then the lower surface 23 of the medium 3 comes into contact with the medium contact portion 27. When the medium 3 is further transported, the medium contact portion 27 pivots downward about the shaft 24 as a pivot fulcrum. As a result, the shaft 22 of the angle adjustment section 25 is moved downward. When the shaft 22 is moved downward, the free end of the angle adjustment section 25 is pivoted upward about the shaft 22 as a pivot fulcrum. By this series of operations, the angle adjustment section 25 is switched from the retracted state (shown in FIGS. 10A, 4A and 4B) to the projecting state (shown in FIGS. 11, 5A and 5B). As a result, the discharge angle θ of the medium 3 increases.

Description of Effects of the Embodiment

Effects from Tapping Member (1) In the first embodiment, the tapping member 11 taps downward the rear end portion 3e of the medium 3 discharged by the discharge section 9. As a result, it is possible to enhance the alignment property in the medium placement section 18 or the like on which the discharged medium 3 is placed.

(2) In the present embodiment, the tapping member 11 retreats when the leading end portion 3*t* of the medium 3 is discharged into the discharge path 13, and when the rear end portion 3*e* of the medium 3 passes through the discharge section 9, the tapping member 11 taps the trailing end portion 3*e* by advancing into the discharge path 13. That is, since the tapping member 11 does not come into contact with the medium 3 while the medium 3 is transported by the discharge section 9 or the like, and comes into contact with the medium 3 when the rear end portion 3*e* of the medium 3 passes through the discharge section 9, it is possible to reduce the risk that the leading end portion of the medium 3 becomes jammed during transport even when the medium 3 has low rigidity. In the present embodiment, as illustrated in FIG. 10A and the like, the discharge section 9 is located downstream of the reading section 5 in the discharge direction. That is, the discharge section 9 starts to discharge the medium 3 toward the medium placement section 18 while the reading section 5 is reading the medium 3. At this time, since the tapping member 11 is in the retracted posture, the tapping member 11 does not contact the medium 3. That is, in the present embodiment, since the tapping member 11 does not come into contact with the medium 3 while the reading section 5 is reading the medium 3, it is possible to suppress influence on the reading accuracy of the reading section 5.

(3) In the present embodiment, a position P2 where the tapping member 11 taps the medium 3 is a position that does not overlap with the discharge section 9 in the discharge direction D. Thus, there is little concern that the rear end portion 3*e* of the medium 3 that was tapped by the tapping member 11 from above will contact the discharge section 9. That is, there is little concern that the rear end portion 3*e* of the medium 3 will come into contact with the discharge section 9 and curls, or will continuously rub against the discharge section 9. Therefore, the medium 3 can be more reliably dropped onto the medium placement section 18 or the like.

(4) In the present embodiment, the tapping member 11 is positioned between the two roller pairs 10 and 10 in the width direction (X-axis direction). As a result, the medium 3 is tapped from above by the tapping member 11 in a state where both sides thereof are nipped by the two roller pairs 10 and 10, so that even if the medium 3 is the thin paper, for example, it can be appropriately discharged to the medium placement section 18 or the like.

(5) In present embodiment, there is provided the posture switching section 15 configured to switch the tapping member 11 between the retracted posture (shown in FIG. 11) and the advanced posture (shown in FIG. 10A). The posture switching section 15 includes the contact portion 17, which is positioned upstream of the tapping member 11 in the discharge direction D and comes into contact with the medium 3, switches the tapping member 11 to the retracted posture (shown in FIG. 11) when the contact portion 17 comes into contact with the medium 3, and switches the tapping member 11 to the advanced posture (shown in FIG. 10A) when the contact portion 17 does not come into contact with the medium 3. As a result, the structure can be simplified, and the tapping operation of the tapping member 11 can be realized.

(6) In the present embodiment, the position P1, where the contact portion 17 and the medium 3 are in contact with each other, overlaps with a part of the discharge section 9 in the discharge direction D. Accordingly, when the medium 3 is discharged by the discharge section 9, the rigidity of the medium 3 in the transport direction F is high due to the contact of the contact portion 17, and thus it is possible to reduce a concern that folding or wrinkling occurs in the medium 3. The position P1 is desirably downstream of the nip point 8, which is a position at which the discharge section 9 nips the medium 3 in the discharge direction D.

(7) In the present embodiment, the contact portion 17 is located between the two roller pairs 10 and 10 in the width direction (X-axis direction). When the medium 3 is nipped at both sides by the two roller pairs 10 and 10, the rigidity of the medium 3 in the transport direction F is increased. Accordingly, since the contact portion 17 comes into contact with the medium 3 in a state in which the rigidity of the medium 3 is increased, it is possible to reduce the risk that the medium 3 is folded or wrinkled.

(8) In the present embodiment, the posture switching section 15 switches the posture of the tapping member 11 by rotating about the rotation shaft 19 as a rotation fulcrum. Furthermore, the rotation shaft 19 is provided upstream of the position P1 at which the contact portion 17 and the medium 3 are in contact with each other in the discharge direction D. Thus, the tapping operation of the tapping member 11 can be easily realized. Further, since the rotation shaft 19 is provided at the position, it is possible to ensure a wide pivot range in which the posture switching section 15 pivots.

(9) In the present embodiment, the tapping member 11 is provided at a position downstream of the discharge section 9 in the discharge direction D. As a result, since the tapping member 11 taps after the rear end portion 3*e* of the medium 3 has passed the nip point 8 of the discharge section 9, the discharged medium 3 can be effectively dropped onto the medium placement section 18 or the like, thereby enhancing the alignment property.

Effects of Discharge Angle Changing Section

(10) In addition, in the present embodiment, the discharge angle changing section 21 is provided which changes the angle at which the medium 3 is discharged upward by a large amount by using as a drive force the downward force received from the medium 3 by coming into contact with the lower surface 23 of the medium 3 that was discharged by the discharge section 9. In other words, since the discharge angle changing section 21 increases the discharge angle θ of the discharged medium 3 upward, the angle at which the discharged medium 3 comes into contact with the medium placement surface 20 such as the medium placement section 18 becomes small. Thus, it is possible to reduce contact friction generated between the medium 3 and the medium placement surface 20

(11) In the present embodiment, the discharge angle changing section 21 includes the angle adjustment section 25, the medium contact portion 27, and the biasing member 29, and the medium contact portion 27 pivots downward against the biasing force of the biasing member 29 by the downward force received from the medium 3 by contacting the medium 3, and changes the angle adjustment section 25 from the retracted state (shown in FIG. 10A) to the projecting state (shown in FIG. 11). The medium 3 to be contacted by the medium contact portion 27 is, for example, the thick paper having high rigidity or the thin paper having low rigidity. The thick paper has a large force that pushes the medium contact portion 27 downward, but the thin paper has a smaller force that pushes the medium contact portion 27 downward than the thick paper has. When the biasing force of the biasing member 29 is the same, since the thick paper greatly lowers the medium contact portion 27 against the biasing force, the protruding amount of the angle adjustment section 25 in the projecting state (shown in FIG. 11) will be large. On the other hand, since the thin paper lowers the medium contact portion 27 to a smaller extent than does the thick paper, the protruding amount of the angle adjustment section 25 in the projecting state (shown in FIG. 11) will be small. As described above, by providing the biasing member 29, the thick paper can be automatically discharged with a large discharge angle θ, and the thin paper can be discharged with a small discharge angle θ. If the discharge angle θ is small, the thick paper may come into contact with the rear end of the previously discharged medium 3 and push it forward. Therefore, the discharge angle θ is desirably large. On the other hand, if the discharge angle θ is large, it is difficult to discharge the thin paper due to air resistance. Therefore, the discharge angle θ is desirably small. In this way, the amount of protrusion of the angle adjustment section 25 can be automatically changed in accordance with the rigidity such as the thickness of the medium 3, and the discharge angle θ can be appropriately adjusted in accordance with the rigidity of the medium 3.

(12) In the present embodiment, as can be understood from the relationship between the relative positions of the positions P1, P2, P3, and P4, the tapping member 11 is configured to tap the rear end portion 3e of the medium 3 after the discharge angle changing section 21 enters the retracted state (shown in FIG. 10A) and when the rear end portion 3e of the medium 3 passes through the discharge section 9. As a result, since the tapping member 11 taps the medium 3 after the rear end portion 3e of the medium 3 does not come into contact with the discharge angle changing section 21, the medium 3 can be more reliably dropped onto the medium placement section 18 or the like. In this embodiment, the position P3 where the medium contact portion 27 is in contact with the medium 3 is located downstream of the position P1 where the contact portion 17 and the medium 3 are in contact with each other in the transport direction. For this reason, a period in which the medium contact portion 27 comes into contact with the medium 3 becomes long, and it is possible to maintain the projecting state of the angle adjustment section 25 for a long period. As a result, since the discharge angle θ can be maintained for a long period of time, the medium 3 can be more appropriately discharged. The positional relationship between the position P1 and the position P3 is not limited to the present embodiment, and can be changed as appropriate.

Second Embodiment

Figure 12:
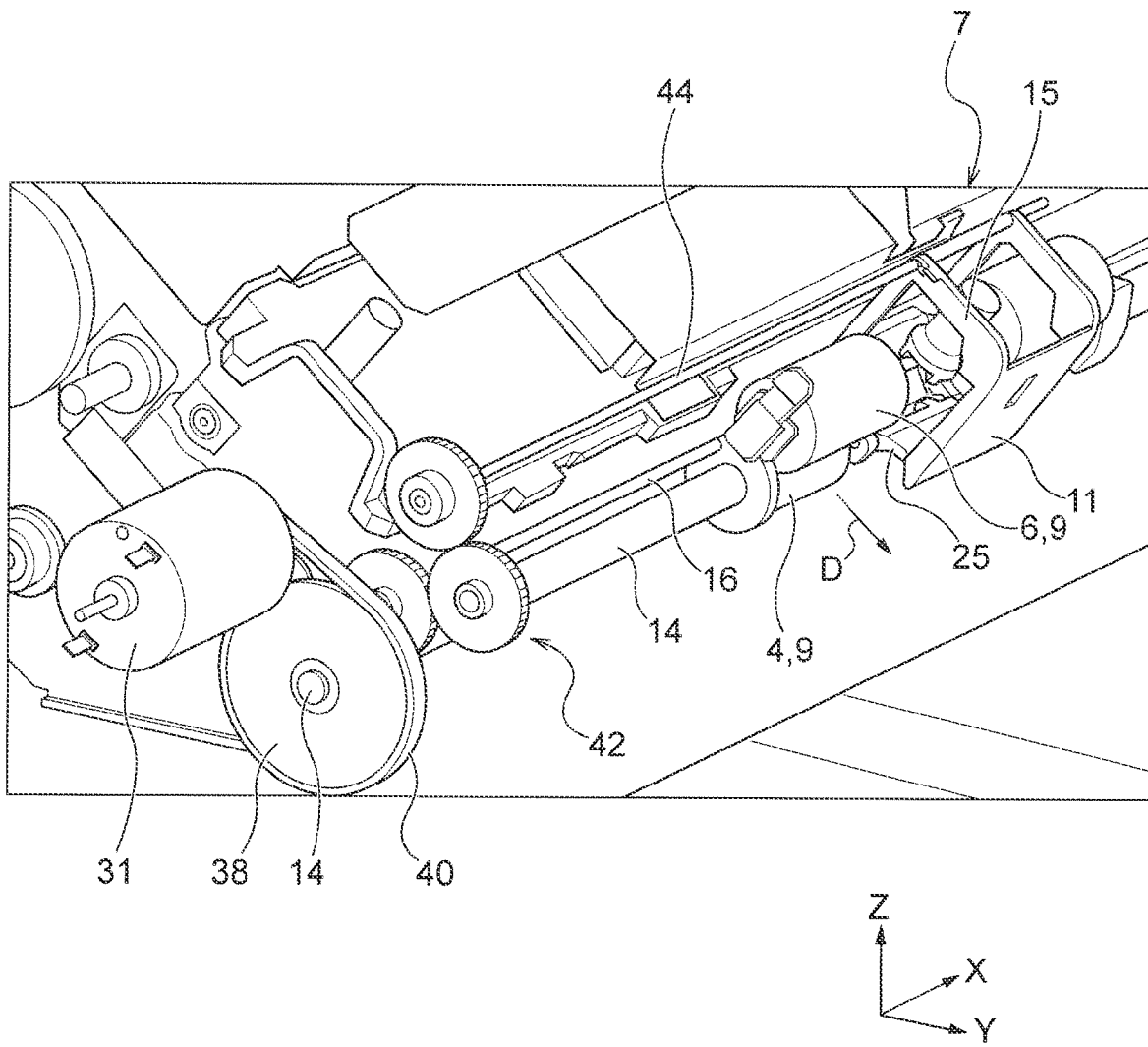
FIG. 12 is a perspective view of a main part of a medium discharge device according to a second embodiment.

The medium discharge device 7 according to the second embodiment and the image reading device 1 including the medium discharge device 7 will be described below with reference to FIGS. 12 and 13. The same portions as those in the first embodiment are denoted by the same reference numerals, and the description of the configuration and the corresponding effects is omitted. In the second embodiment, a discharge motor is provided as a drive source 31 for generating the drive force of the discharge section 9. The tapping member 11 is retracted from the discharge path 13 when the leading end portion 3t of the medium 3 is discharged into the discharge path 13 by the discharge section 9. On the other hand, the tapping member 11 taps the rear end portion 3e of the medium 3 by advancing into the discharge path 13 when the rear end portion 3e passes through the discharge section 9. In the present embodiment, the tapping member 11 is configured to enter the retracted state (shown in FIG. 11 and FIG. 1B) or the projecting state (shown in FIGS. 10A and FIG. 1A) by the drive force of the drive source 31. Here, it is configured such that the passage of the rear end portion 3e of the medium 3 through the discharge section 9 is detected by a medium sensor (not shown).

More specifically, a one-way gear 38 is attached to the rotation shaft 14 of the discharge drive roller 4 constituting the discharge section 9. Drive force is transmitted from the drive source 31 to the one-way gear 38 via a belt 40. The one-way gear 38 discharges the medium 3 by rotating the rotation shaft 14 of the discharge drive roller 4 in the forward rotation direction when the drive source 31 rotates in the forward direction, but does not rotate the rotation shaft 14 in the reverse rotation direction. The drive source 31 can transmit drive force to a rotation shaft 44 via a gear train 42. The posture switching section 15 is attached to the rotation shaft 44. A cam structure 46 is provided between the rotation shaft 44 and the posture switching section 15, and the cam structure 46 is configured to be able to switch the transmission state and the non-transmission state of the drive force. The gear train 42 is configured such that when the drive source 31 rotates in the reverse direction, the gear train 42 rotates the rotation shaft 44 to move the tapping member 11 up and down. The drive force of the drive source 31 may be transmitted to the discharge angle changing section 21 through the gear train 42, and the discharge angle changing section 21 may be operated by using the drive force of the drive source 31.

Figure 13:
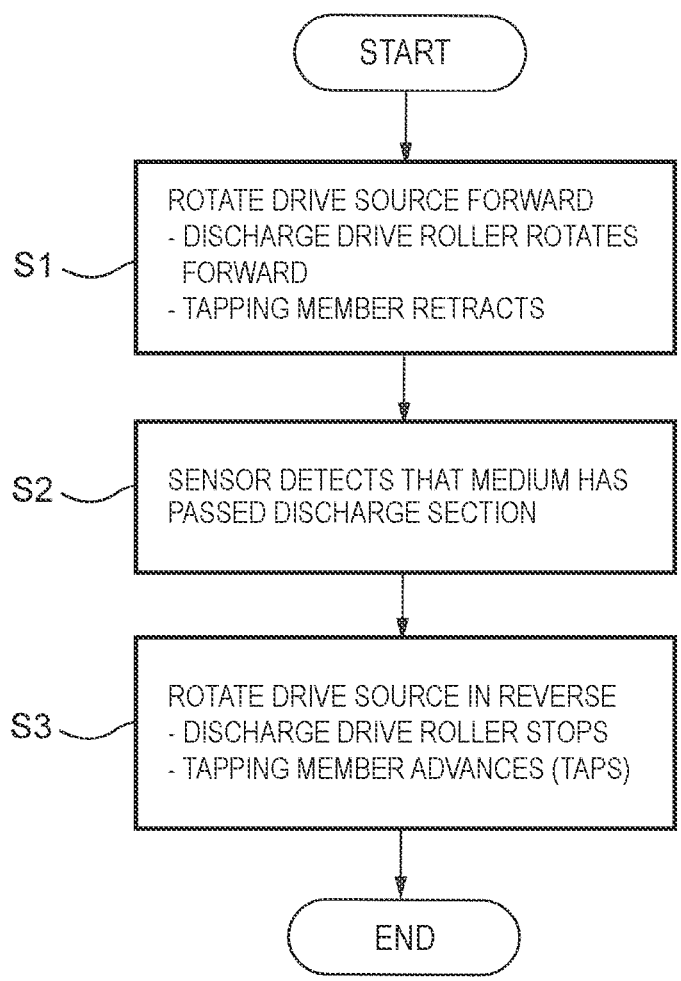
FIG. 13 is a flowchart for explaining the operation of the medium discharge device according to the second embodiment.

With reference to FIG. 13, a flow of the operation of moving the tapping member 11 vertically by the drive force of the drive source 31 will be described. This flow is executed by a control unit (not shown). In step S1, the drive source 31 rotates in the forward direction, the discharge drive roller 4 also rotates in the forward direction, and the discharge operation of the medium 3 is performed. In step S2, when the medium sensor (not shown) detects that the rear end portion 3e of the medium 3 has passed the discharge section 9, the process proceeds to step S3. In step S3, the drive source 31 is changed to the reverse rotation, the discharge drive roller 4 enters a stopped state by the one-way gear 38, and in this state, the tapping member 11 taps the rear end portion 3e of the medium 3 downward.

According to the second embodiment, since the tapping member 11 taps the rear end portion 3e of the medium 3 by the drive force of the drive source 31, it is possible to more reliably drop the medium 3 onto the medium placement section 18 or the like.

OTHER EMBODIMENTS

Although the medium discharge device 7 and the image reading device 1 provided with the medium discharge device 7 according to the present disclosure basically have the configurations of the above-described embodiments, it is of course possible to change or omit partial configurations within the scope of and without departing from the gist of the present disclosure.

(1) In each of the above-described embodiments, the apparatus including the medium discharge device 7 according to the present disclosure has been described as the image reading device 1. However, the present disclosure is not limited thereto, and can be applied to a printing apparatus, a medium transport apparatus, or the like.

(2) In the above embodiments, the structure in which the medium discharge device 7 includes the discharge angle changing section 21 in addition to the tapping member 11 has been described, but the medium discharge device 7 may have a structure in which the discharge angle changing section 21 is not provided.

(3) In the first embodiment, the tapping member 11 has been described as a structure having no biasing member. More specifically, the tapping member 11 is rotated about the rotation shaft 19 as a rotation fulcrum by utilizing its own weight, and taps. The present disclosure is not limited to this, but the tapping member 11 may be provided with a biasing member, and the tapping member 11 may tap by rotating around the rotation shaft 19 as a rotation fulcrum using the biasing force.

(4) The structure of the tapping member 11 is not limited to the structure described above.

(5) When the thin paper is transported, the angle adjustment section 25 may be configured to maintain the retracted state. That is, when the thick paper is conveyed, the angle adjustment section 25 may be configured to switch from the retracted state to the projecting state. This configuration may be realized, for example, by adjusting the biasing force of the biasing member 29. Alternatively, it may be realized by providing a predetermined clearance between the angle adjustment section 25 and the medium contact portion 27. A configuration may be adopted in which, when the thin paper is transported, the clearance is not clogged and the angle adjustment section 25 maintains the retracted state, whereas, when the thick paper is conveyed, the clearance is clogged and the angle adjustment section 25 changes from the retracted state to the projecting state.

What is claimed is:

1. An image reading device comprising:
a reading section configured to read an image of a transported medium;
a discharge section configured to discharge the transported medium in a discharge direction;
a tapping member configured to tap downward a rear end portion of the medium discharged by the discharge section; and
a drive source configured to generate drive force for the discharge section, wherein
the tapping member
is retracted from a discharge path when a leading end portion of the medium is discharged into the discharge path by the discharge section,
taps the rear end portion by advancing into the discharge path when the rear end portion of the medium passes through the discharge section, and
enters the retracted state or the advancing state by drive force of the drive source.

2. The image reading device, according to claim 1, wherein
the position at which the tapping member taps the medium is a position that does not overlap the discharge section in the discharge direction.

3. The image reading device, according to claim 2, wherein
the discharge section includes two roller pairs in a width direction, which intersects the discharge direction and
the tapping member is located between the two roller pairs in the width direction.

4. The image reading device, according to claim 1, wherein
the tapping member is located downstream of the discharge section in the discharge direction.

5. An image reading device comprising:
a reading section configured to read an image of a transported medium;
discharge section configured to discharge the transported medium in a discharge direction;
a tapping member configured to tap downward a rear end portion of the medium discharged by the discharge section; and
a posture switching section configured to switch between a retracted posture, in which the tapping member is retracted from a discharge path of the medium, and an advanced posture, in which the tapping member is advanced into the discharge path, wherein
the posture switching section
includes a contact portion that is located upstream of the tapping member in the discharge direction and comes into contact with the medium to be discharged,
switches the tapping member to the retracted posture when the contact portion comes into contact with the medium, and
switches the tapping member to the advanced posture when the contact portion is not in contact with the medium.

6. The image reading device, according to claim 5, wherein
a position where the contact portion and the medium come into contact with each other overlaps a part of the discharge section in the discharge direction.

7. The image reading device, according to claim 5, wherein
the discharge section includes two roller pairs in a width direction, which intersects the discharge direction and
the contact portion is located between the two roller pairs in the width direction.

8. The image reading device, according to claim 5, wherein
the posture switching section
includes a rotation shaft and
switches the posture of the tapping member by rotating about the rotation shaft and
the rotation shaft is located, in the discharge direction, upstream of a position at which the contact portion and the medium come into contact with each other.

9. An image reading device comprising:
a reading section configured to read an image of a transported medium;
a discharge section configured to discharge the transported medium in a discharge direction;
a tapping member configured to tap downward a rear end portion of the medium discharged by the discharge section; and a discharge angle changing section that comes into contact with a lower surface of the medium discharged by the discharge section and increases an angle in an upward direction at which the medium is discharged, wherein the discharge angle changing section includes an angle adjustment section configured to enter a projecting state, in which the angle adjustment section protrudes from a transport path along which the medium is transported and comes into contact with a lower surface of the medium, and a retracted state, in which the angle adjustment section is retracted from the transport path, a medium contact portion configured to pivot in a vertical direction and to come into contact with a lower surface of the medium being transported toward the discharge section, and a biasing member for biasing the angle adjustment section in a direction in which the angle adjustment section is retracted from the transport path and the medium contact portion pivots downward against the biasing force of the biasing member by coming into contact with the medium and switches the angle adjustment section from the retracted state to the projecting state.

10. The image reading device, according to claim 9, wherein after the discharge angle changing section enters the retracted state, the tapping member taps the rear end portion of the medium when the rear end portion of the medium passes through the discharge section.

11. The image reading device, according to claim 9, wherein a position where the medium contact portion comes into contact with the medium is upstream of a position where the angle adjustment section comes into contact with the lower surface of the medium in the discharge direction.

12. The image reading device, according to claim 9, wherein the discharge section includes two roller pairs in a width direction, which intersects the discharge direction and the discharge angle changing section is located between the two roller pairs in the width direction.

13. The image reading device, according to claim 12, wherein a position where the angle adjustment section is in contact with the medium is located downstream of a nip position of the roller pair in the discharge direction.

14. The image reading device, according to claim 9, wherein when the angle adjusting member separates from the medium, the angle adjustment member enters a retracted state in which the angle adjusting member retracts from the transport path along which the medium is transported and after the discharge angle changing section enters the retracted state, the tapping member taps the rear end portion of the medium when the rear end portion of the medium passes through the discharge section.

* * * * *